US006762008B2

(12) United States Patent
Satoh et al.

(10) Patent No.: US 6,762,008 B2
(45) Date of Patent: Jul. 13, 2004

(54) OPTICAL RECORDING MEDIUM

(75) Inventors: Tsutomu Satoh, Kanagawa (JP); Shohji Maruyama, Kanagawa (JP); Tatsuya Tomura, Tokyo (JP); Noboru Sasa, Kanagawa (JP); Yasunobu Ueno, Kanagawa (JP); Yasuhiro Higashi, Kanagawa (JP); Soh Noguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 63 days.

(21) Appl. No.: 10/104,407

(22) Filed: Mar. 21, 2002

(65) Prior Publication Data

US 2003/0068576 A1 Apr. 10, 2003

Related U.S. Application Data

(63) Continuation of application No. 09/609,419, filed on Jul. 5, 2000, now abandoned.

(30) Foreign Application Priority Data

Jul. 6, 1999 (JP) .......................................... 11-191161
Jun. 28, 2000 (JP) ...................................... 2000-193869
Jun. 30, 2000 (JP) ...................................... 2000-197466

(51) Int. Cl.[7] .................................................. G11B 7/24
(52) U.S. Cl. ............................ 430/270.16; 430/220.19; 430/945; 428/64.8
(58) Field of Search ....................... 430/270.16, 220.19, 430/945; 428/64.8

(56) References Cited

U.S. PATENT DOCUMENTS 2,713,581 A * 7/1955 Pannone et al. ............ 534/652
3,547,901 A * 12/1970 Leinhard et al. ............ 534/652
4,714,667 A 12/1987 Sato et al. .................. 430/270
4,735,839 A 4/1988 Sato et al. ..................... 428/64
4,737,444 A 4/1988 Satoh et al. ............. 430/272.1
4,767,693 A 8/1988 Oba et al. ................... 430/584
4,891,305 A 1/1990 Oba et al. ................... 430/495
5,002,812 A 3/1991 Umehara et al. ............. 428/64
5,028,467 A 7/1991 Maruyama et al. ........... 428/64
5,085,909 A 2/1992 Satoh et al. .................. 428/64
5,149,819 A 9/1992 Satoh et al. ................ 548/149
5,256,794 A 10/1993 Satoh et al. ................ 548/491
5,260,165 A 11/1993 Satou et al. ................ 430/271
5,294,471 A * 3/1994 Evans et al. ................ 430/945
5,510,229 A 4/1996 Satoh et al. ........... 430/270.18
5,604,004 A * 2/1997 Suzuki et al. ............... 430/945
5,731,054 A * 3/1998 Chapman et al. ........... 430/945
5,773,193 A * 6/1998 Chapman et al. ...... 430/270.16
5,786,124 A * 7/1998 Chapman et al. ...... 430/270.16
5,863,703 A 1/1999 Tomura et al. ........ 430/270.16
5,922,429 A * 7/1999 Chapman et al. ........... 430/945
5,922,504 A * 7/1999 Chapman et al. ...... 430/270.19
5,939,163 A 8/1999 Ueno et al. ................ 428/64.1
5,998,093 A 12/1999 Tomura et al. ........ 430/270.16
6,057,020 A * 5/2000 Ueno et al. ................. 430/945
6,197,477 B1 * 3/2001 Satoh et al. ........... 430/270.16
6,225,022 B1 * 5/2001 Tomura et al. ........ 430/270.16

FOREIGN PATENT DOCUMENTS

JP 10-337958 * 12/1998 ............ 430/270.18

* cited by examiner

*Primary Examiner*—Martin Angebranndt
(74) *Attorney, Agent, or Firm*—Cooper & Dunham LLP

(57) ABSTRACT

An optical recording medium has a substrate, and a recording layer formed thereon which contains at least one formazan chelate compound of formula (I), (II) or (I)

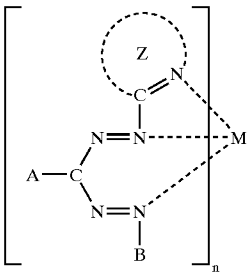

(II)

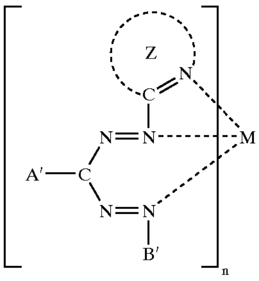

(III)

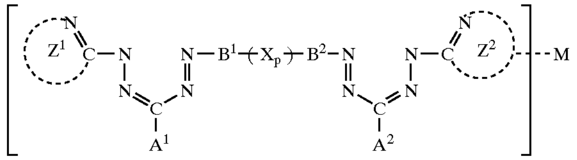

wherein A, B, A', B', $A^1$, $A^2$, $B^1$, $B^2$, Z, $Z^1$, $Z^2$, M, p, and n are specified in the specification.

15 Claims, No Drawings

OPTICAL RECORDING MEDIUM

CROSS REFERENCE TO RELATED APPLICATION

This application is a continuation of applicants' U.S. patent application Ser. No. 09/609,419, filed Jul. 5, 2000 now abandoned.

BACKGROUND OF THE INVENTION

1. Field of the Invention

The present invention relates to an optical, recording medium, and in particular, to an optical information recording medium capable of recording information therein, and reproducing the information therefrom by causing an optical change in, for example, transmittance and reflectance of a recording material for use in the recording medium when the recording medium is irradiated with a light beam. Further, the present invention relates to an optical recording medium of a write once read many (WORM) type, such as a WORM type optical disc, in particular, a digital video disc-recordable (DVD-R) for use in a high-density optical disc system using a semiconductor laser beam with a shorter wavelength.

2. Discussion of Background

The DVD-R has been developed as a next generation disc with a large capacity. The possibilities of increasing the recording capacity of the DVD-R are in the development of the recording material that can minimize a recording pit to be formed, introduction of image compression technologies such as Moving Picture Experts Group-2 (MPEG 2), and improvement in the method of shortening the wavelength of the semiconductor laser used to read the recording pit.

An AlGaInP laser diode with a wavelength of 670 nm is only one red semiconductor laser that has been developed and commercialized for a bar code reader and a measuring instrument. Along with the development of the optical disc with high recording density, the red semiconductor laser has been introduced and used in practice in the optical recording industry. For a driving system for a digital video disc (DVD), two types of laser diodes with different wavelengths of 635 nm and 650 nm are standardized as the light sources For attaining a higher recording density, a laser beam with a shorter wavelength is preferred. For a driving system for a DVD-R, 635 nm is a preferable wavelength for the light source. A reproduction-only DVD-ROM drive equipped with a light source with a wavelength of 650 nm or less is now commercially available.

Under such circumstances, the most preferable is a DVD-R that can record information therein and reproduce the information therefrom at a wavelength of 635 nm or less, or 650 nm or less only for the reproducing operation. Accordingly, there is an increasing demand for a recording material for use in the DVD-R, with excellent light resistance and storage stability and capable of recording and reproducing information by an optical pickup system using a laser beam having a wavelength of 650 nm or less.

As the recording materials for use in the DVD-R, a polymethine dye and an azo chelate dye have been conventionally developed.

A polymethine dye is disclosed as the recording material in Japanese Laid-Open Patent Applications 10-83577, 10-119434, 10-149583, 10-188339, and 10-278426.

Of the polymethine dyes, a cyanine dye and a squarylium dye have particularly excellent optical properties, and can provide adequate signal characteristics. However, the light resistance of the above-mentioned dyes is too poor to be used alone in practice. To compensate for the poor light resistance of the polymethine dye, there has been developed a light stabilizer which can work when used in combination with the polymethine dye. For example, the combination of a polymethine dye and a light stabilizer is disclosed in Japanese Laid-Open Patent Applications 10-109475, 10-109476, 10-134413, 10-151861, and 10-166739.

However, no combination has been found that can satisfy both the light resistance and the signal characteristics.

An azo chelate dye is disclosed as the recording material in Japanese Laid-Open Patent Applications 8-295811, 8-295812, 9-332772, 9-39394, 10-6650, 10-58828, 10-157293, 10-157300, 10-188340, and 10-188341. The light resistance of the azo chelate dyes is also poor although adequate signal characteristics can be obtained.

A formazan chelate dye is known to have excellent light stability. The application of the formazan chelate dye to the optical recording material is disclosed in Japanese Laid-Open Patent Applications 8-295079, 9-193546, 10-152623, and 10-154350. However, any of the above-mentioned conventional formazan chelate dyes exhibit the absorption in a long wavelength range, and therefore they are not suitable for the recording materials for use in the DVD-R.

The use of the formazan chelate dye as the light stabilizer for the cyanine dye has been examined. In general, the light stabilizing mechanism results from excitation transfer from the main dye to the light stabilizer. An effective light stabilizer is therefore required to exhibit absorptive power at such an energy level that is close to and lower than the excited energy of the main dye. In light of the above-mentioned light stabilizing mechanism, the absorption band of the formazan chelate dye is located at too long a wavelength to provide an adequate light stabilizing effect.

Furthermore, it is proposed to use any other dye and a metal reflection layer, as disclosed in Japanese Laid-Open Patent Applications 8-169182, 8-209012, and 9-58130.

SUMMARY OF TEE INVENTION

An object of the present invention is to provide an optical recording medium with excellent light resistance and storage stability, especially suitable for the DVD-R which can cope with a high-density optical disc system using a semiconductor laser having a shorter wavelength.

Another object of the present invention is to provide an optical recording medium comprising a recording material which is highly soluble in organic solvents.

The above-mentioned objects of present invention can be achieved by an optical recording medium comprising a substrate, and a recording layer formed thereon comprising a formazan chelate compound selected from the group consisting of:

a compound represented by the following formula (I):

(I)

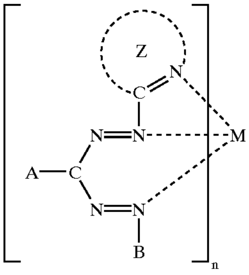

wherein Z represents a group that forms a polyheterocyclic ring with a carbon atom and a nitrogen atom that are bounded thereto, A is an alkyl group, an aralkyl group, an aryl group, or cyclohexyl group, B is an aryl group, M represents a bivalent metal atom; and n represents the coordination number of formazan ligands;

a compound represented by the following formula (II):

(II)

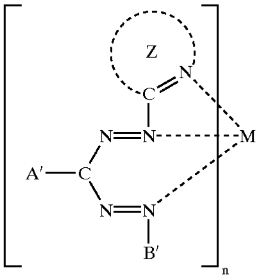

wherein Z represents a group that forms a polyheterocyclic ring with a carbon atom and a nitrogen atom that are bounded thereto, A' represents a five-membered ring or six-membered ring, or a group that constitutes the heterocyclic ring, B' is an aryl group or an alkyl group, M represents a bivalent metal atom, and n represents the coordination number of formazan ligands; and a compound represented by the following formula (III):

(III)

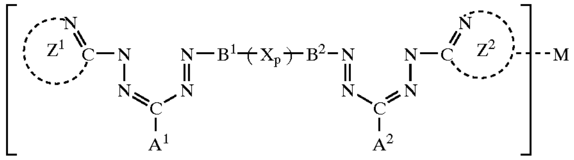

wherein $Z^1$ and $Z^2$ are each a group that forms a heterocyclic ring with a carbon atom and a nitrogen atom that are bounded thereto, $A^1$ and $A^2$ are each an alkyl group, an aralkyl group, an aryl group, or cyclohexyl group, $B_1$ and $B_2$ are each an aryl group, p is an integer of 0 or 1, and when p is 1, X is methylene group, or sulfone group, and M represents a bivalent metal atom.

The formazan chelate compound of formula (I), (II) or (III) for use in the present invention can also serve as a light stabilizer when used together with the conventional recording dyes, such as a polymethin dye, squarylium dye, and azo chelate dye which can provide excellent signal characteristics in the DVD-R.

DESCRIPTION OF THE PREFERRED EMBODIMENTS

Through intense studies by the present inventors, it is found that a recording layer comprising as the main component a formazan chelate dye having a specific structure can provide an optical recording medium with. high light resistance and storage stability. Such an optical recording medium can cope with a high-density optical disc system using a semiconductor laser with a wavelength of 700 nm or less.

One of the optical recording media that is commercially available is a compact disc-recordable (CD-R) in accordance with the standards of the compact disc (CD) In the CD-R, a recording layer is irradiated with a laser beam having a wavelength of 770 to 830 nm to cause a physical or chemical change in the recording layer, and light reflected by the recording layer is detected. Thus, recording and reproducing of information can be achieved.

The development of the semiconductor laser with a shorter wavelength is in progress. In particular, a red semiconductor laser having a wavelength of 630 to 680 nm is used in practice. The shorter wavelength of the laser beam for recording and reproducing can diminish a beam diameter, with a result that a high-density optical recording medium can be obtained.

The optical recording medium according to the present invention is directed to a WORM type medium such as DVD-R that can record information therein and reproduce the information therefrom within a wavelength range of 630 to 680 nm. Specifically, current standards of the DVD-R are recording at 635 nm and reproducing at 650 nm; and recording and reproducing at 650 nm.

<Structure>

Basically, the optical recording medium according to the present invention comprises a substrate and a recording layer formed thereon. Optionally, an undercoat layer may be interposed between the substrate and the recording layer when necessary. The two recording media may be laminated so that an air gap is formed between the opposite recording layers. This structure is called an air-sandwich structure, which is for a WORM type optical disc.

Such a structure that a recording layer, a light reflection layer, and a protective layer are successively overlaid on a substrate is used for the CD-R. Two CD-R structures may be laminated.

Further, such a structure that a recording layer, a light reflection layer, a protective layer, an adhesive layer, and a support member are successively overlaid on a substrate is used for the DVD-R.

<Substrate>

When recording and reproduction are carried out at the substrate side, it is required that the substrate be transparent to the laser beam employed for the recording and reproduction. However, such transparency is unnecessary when recording and reproduction are carried out at the recording layer side.

Examples of the material for the substrate are plastics such as polyester, acrylic resin, polyamide, polycarbonate resin, polyolefin resin, phenolic resin, epoxy resin, and polyimide; glass; ceramics; and metals. Guide grooves or guide pits for tracking may be formed on the surface of the substrate. Furthermore, preformats for address signals may also be formed on the surface of the substrate.

The substrate generally has a thickness of 0.6 mm for use in the optical recording media of the present invention.

<Recording Layer>

Information is recorded in the recording layer by causing some optical changes in the recording layer when the recording layer is irradiated with a laser beam. According to the present invention, the recording layer comprises at least one selected from the group consisting of formazan chelate compounds of formulas (I), (II) and (III).

The formazan chelate compound of formula (I) is as follows:

(I)

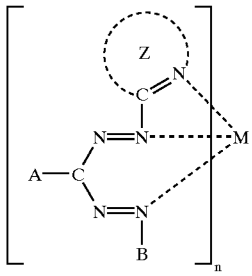

wherein Z represents a group that forms a polyheterocyclic ring with a carbon atom and a nitrogen atom that are bounded thereto; A in formula (I) is an alkyl group, an aralkyl group, an aryl group, or cyclohexyl group; B is an aryl group; M represents a bivalent metal atom; and n represents the coordination number of formazan ligands.

Examples of the substituent for A in formula (I) include an alkyl group, an alkoxyl group, a halogen atom, a keto group, carboxyl group and an ester thereof, nitrile group, and nitro group.

Examples of the polyheterocyclic ring formed together with Z in formula (I) include thiazole ring, benzothiazole ring, oxazole ring, benzoxazole ring, pyrazole ring, benzopyrazole ring, imidazole ring, benzimidazole ring, oxadiazole ring, triazole ring, thiadiazole ring, pyridazine ring, pyrimidine ring, pyrazine ring, triazine ring, naphthalidine ring, cinnoline ring, quinazoline ring, quinoxaline ring, and phenazine ring. Preferred are pyridazine ring, pyrimidine ring, pyrazine ring, and triazine ring in view of optical properties, storage stability, and light resistance.

The polyheterocyclic ring may have a substituent such as an alkyl group, an alkoxyl group, a thioalkoxyl group, a substituted amino group, an aryl group, an aryloxy group, anilino group, and a keto group.

Examples of the aryl group represented by B in formula (I) include phenyl group, pentalenyl group, indenyl group, naphthyl group, azulenyl group, heptalenyl group, biphenylenyl group, as-indacenyl group, s-indacenyl group, acenaphthalenyl group, fluorenyl group, phenalenyl group, phenanthranyl group, anthranyl group, fluoracenyl group, acephenanthranyl group, aceanthrylene group, triphenylenyl group, pyrenyl group, crysenyl group, and naphthacenyl group.

The aryl group represented by B may have a substituent such as an alkyl group, an alkoxyl group, a halogen group, carboxyl group and an ester thereof, nitrile group, and nitro group.

Examples of the bivalent metal atom represented by M in formula (I) include titanium, vanadium, chromium, manganese, iron, cobalt, nickel, copper, zinc, zirconium, niobium, molybdenum, technetium, ruthenium, rhodium, and palladium. Preferred are iron, cobalt, nickel, copper, zinc, and palladium in view of optical properties, storage stability, and light stability.

Examples of the halogen atom used as the substituent for A and B in formula (I) include fluorine, chlorine, bromine and iodine atom.

Examples of the alkyl group represented by A and the substituents for A and B in formula (I) include straight-chain alkyl groups such as methyl group, ethyl group, n-propyl group, n-butyl group, n-pentyl group, n-hexyl group, n-heptyl group, n-octyl group, n-nonyl group, and n-decyl group; branched alkyl groups such as isobutyl group, isoamyl group, 2-methylbutyl group, 2-methylpentyl group, 3-methylpentyl group, 4-rnethylpentyl group, 2-ethylbutyl group, 2-methylhexyl group, 3-methylhexyl group, 4-methylhexyl group, 5-methylhexyl group, 2-ethylpentyl group, 3-ethylpentyl group, 2-methylheptyl group, 3-methylheptyl group, 4-methylheptyl group, 5-methylheptyl group, 2-ethylhexyl group, 3-ethylhexyl group, isopropyl group, sec-butyl group, 1-ethylpropyl group, 1-rnethylbutyl group, 1,2-dimethylpropyl group, 1-methylheptyl group, 1-ethylbutyl group, 1,3-dimethylbutyl group, 1,2-dimethylbutyl group, 1-ethyl-2-methylpropyl group, 1-methylhexyl group, 1-ethylheptyl group, 1-propylbutyl group, 1-isopropyl-2-methylpropyl group, 1-ethyl-2-methylbutyl group, 1-ethyl-2-methylbutyl group, 1-propyl-2-methylpropyl group, 1-methylheptyl group, 1-ethylhexyl group, 1-propylpentyl group, 1-isopropylpentyl group, 1-isopropyl-2-methylbutyl group, 1-isopropyl-3-methylbutyl group, 1-methyloctyl group, 1-ethylheptyl group, 1-propylhexyl group, 1-isobutyl-3-methylbutyl group, neopentyl group, tert-butyl group, tert-hexyl group, tert-amyl group, and tert-octyl group; and cycloalkyl groups such as cyclohexyl group, 4-methylcyclohexyl group, 4-ethylcyclohexyl group, 4-tert-butylcyclohexyl group., 4-(2-ethylhexyl)cyclohexyl group, bornyl group, and isobornyl group (adamantane group).

The above-mentioned straight-chain and branched alkyl groups may have a substituent such as hydroxyl group, a halogen atom, nitro group, carboxyl group, cyano group, a substituted or unsubstituted aryl group, or a residue of a substituted or unsubstituted heterocyclic ring. Further, the alkyl group may have as a substituent the above-mentioned alkyl group via oxygen atom, sulfur atom, or nitrogen atom. Examples of the alkyl group having as a substituent an alkyl group via oxygen atom include methoxymethyl group, methoxyethyl group, ethoxymethyl group, ethoxyethyl group, butoxyethyl group, ethoxyethoxyethyl group, phenoxyethyl group, methoxypropyl group, and ethoxypropyl group. Examples of the alkyl group having as a substituent an alkyl group via sulfur atom include methylthioethyl group, ethylthioethyl group, ethylthiopropyl group, and phenylthioethyl group. Examples of the alkyl group having as a substituent an alkyl group via nitrogen atom include dimethylaminoethyl group, diethylaminoethyl group, and diethylaminopropyl group.

Examples of the aryl group represented by A and the substituent for the polyheterocyclic ring in formula (I) include phenyl group, pentalenyl group, indenyl group, naphthyl group, azulenyl group, heptalenyl group, biphenylenyl group, as-indacenyl group, s-indacenyl group, acenaphthalenyl group, fluorenyl group, phenalenyl group, phenanthranyl group, anthranyl group, fluoracenyl group, acephenanthranyl group, aceanthrylene group, triphenylenyl group, pyrenyl group, crysenyl group, and naphthacenyl group. These aryl groups may have a substituent such as hydroxyl group, a halogen atom, nitro group, carboxyl group, cyano group, a substitute or unsubstituted aryl group, or a residue of a substituted or unsubstituted heterocyclic ring. Further, the aryl group may have as a substituent the above-mentioned alkyl group via oxygen atom, sulfur atom, or nitrogen atom.

As the alkoxyl group serving as the substituents, there can be used the groups prepared by directly bonding the above-mentioned substituted or unsubstituted alkyl groups to an oxygen atom. As the aryloxy group serving as the substituent for the polyheterocyclic ring, there can be used the groups prepared by directly bonding the above-mentioned substituted or unsubstituted aryl groups to an oxygen atom.

In formula (I), n represents the coordination number of formazan ligands. The coordination number is generally in the range of 1 to 3, preferably 2.

Specific examples of the formazan chelate compound of formula (I) are shown in TABLE 1.

TABLE 1

(I)

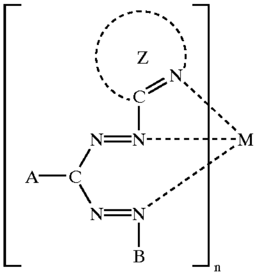

| Comp. No. | A | B | Z | M | n |
|---|---|---|---|---|---|
| I-1 | 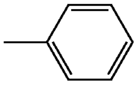 | $—CH(CH_3)_2$ | 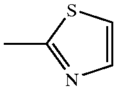 | Ni | 2 |
| I-2 | 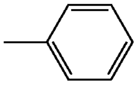 | 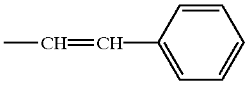 | 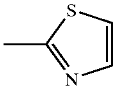 | Co | 2 |
| I-3 | 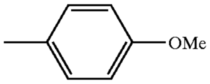 | 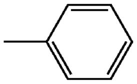 | 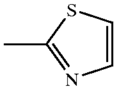 | Cu | 2 |
| I-4 | 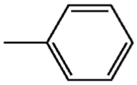 | $—CH(CH_3)_2$ | 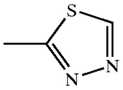 | Ni | 2 |
| I-5 | 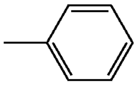 | 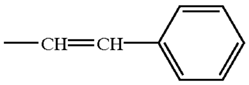 | 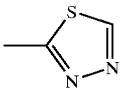 | Zn | 2 |
| I-6 | 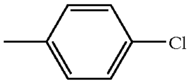 | 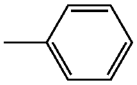 | 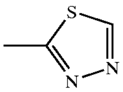 | Ni | 2 |
| I-7 | 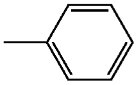 | $—CH(CH_3)_2$ | 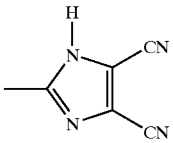 | Cu | 2 |
| I-8 | 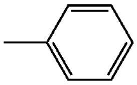 | 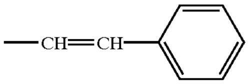 | 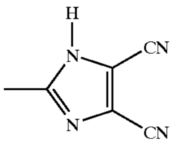 | Co | 2 |
| I-9 | 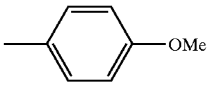 | 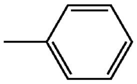 | 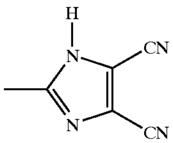 | Ni | 2 |

TABLE 1-continued
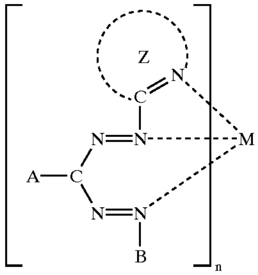
(I)
| Comp. No. | A | B | Z | M | n |
|---|---|---|---|---|---|
| I-10 | 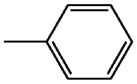 | 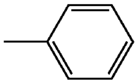 | 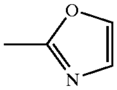 | Ni | 2 |
| I-11 | 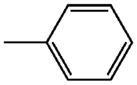 | $-CH(CH_3)_2$ | 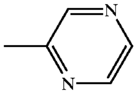 | Co | 3 |
| I-12 | 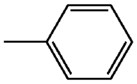 | 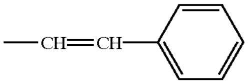 | 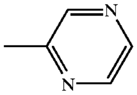 | Ni | 2 |
| I-13 | 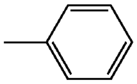 | 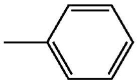 | 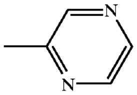 | Cu | 2 |
| I-14 | 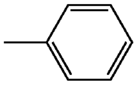 | $-CH(CH_3)_2$ | 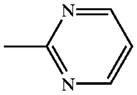 | Ni | 2 |
| I-15 | 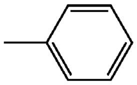 | 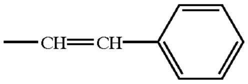 | 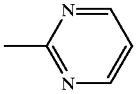 | Cr | 3 |
| I-16 | 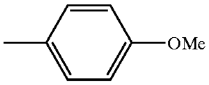 | 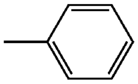 | 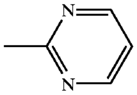 | Co | 2 |
| I-17 | 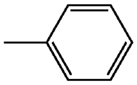 | $-CH(CH_3)_2$ | 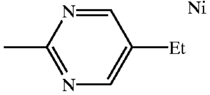 | Ni | 2 |
| I-18 | 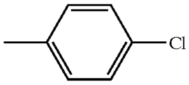 | 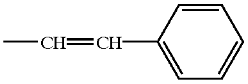 | 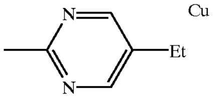 | Cu | 2 |
| I-19 | 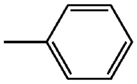 | 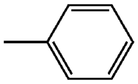 | 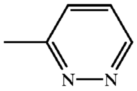 | Cu | 2 |
| I-20 | 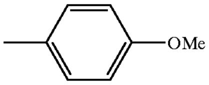 | $-CH(CH_3)_2$ | 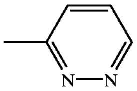 | Fe | 2 |

TABLE 1-continued
(I)
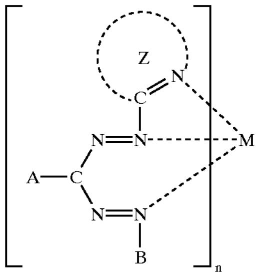
| Comp. No. | A | B | Z | M | n |
|---|---|---|---|---|---|
| I-21 | 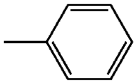 | 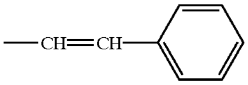 | 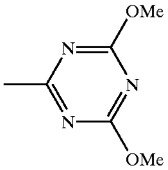 | Ni | 2 |
| I-22 | 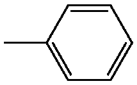 | 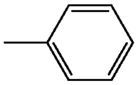 | 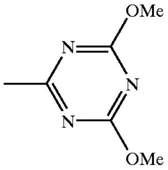 | Cr | 3 |
| I-23 | 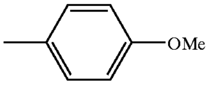 | 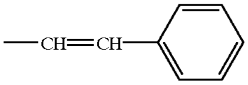 | 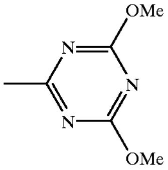 | Ni | 2 |
| I-24 | 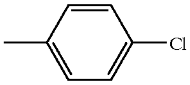 | 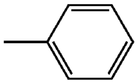 | 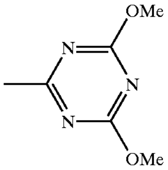 | Ni | 2 |
| I-25 | 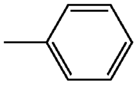 | $—CH(CH_3)_2$ | 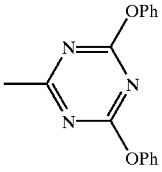 | Co | 2 |
| I-26 | 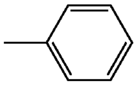 | 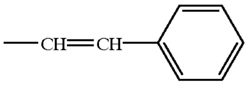 | 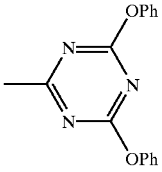 | Ni | 2 |

TABLE 1-continued
(I)
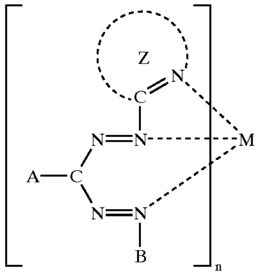
| Comp. No. | A | B | Z | M | n |
|---|---|---|---|---|---|
| I-27 | 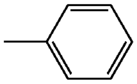 | 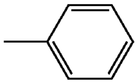 | 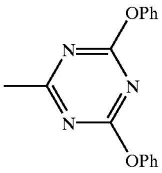 | Ni | 2 |
| I-28 | 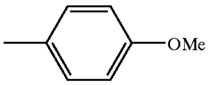 | 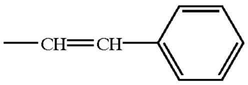 | 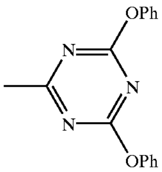 | Cu | 2 |
| I-29 | 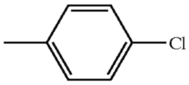 | 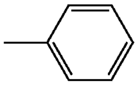 | 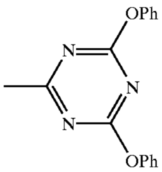 | Co | 2 |
| I-30 | 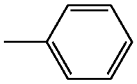 | $—CH(CH_3)_2$ | 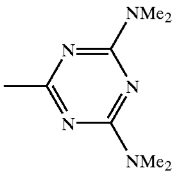 | Cu | 2 |
| I-31 | 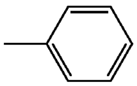 | 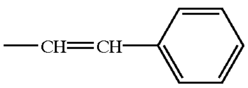 | 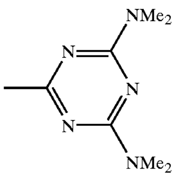 | Ni | 2 |
| I-32 | 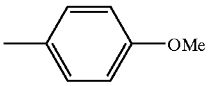 | 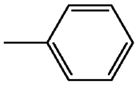 | 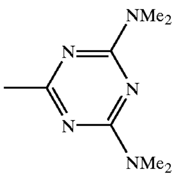 | Co | 2 |

TABLE 1-continued
(I)
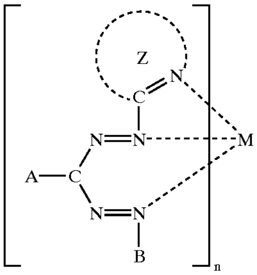
| Comp. No. | A | B | Z | M | n |
|---|---|---|---|---|---|
| I-33 | 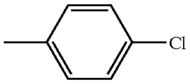 | 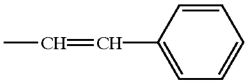 | 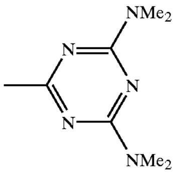 | Cr | 3 |
| I-34 | 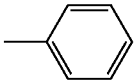 | $—CH(CH_3)_2$ | 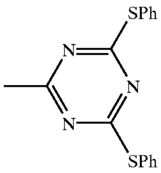 | Zn | 2 |
| I-35 | 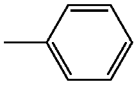 | 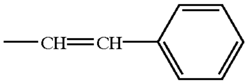 | 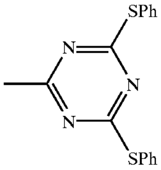 | Ni | 2 |
| I-36 | 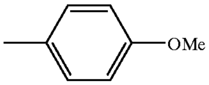 | 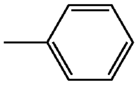 | 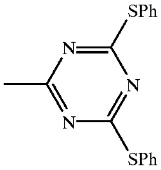 | Ni | 2 |
| I-37 | 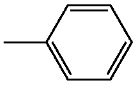 | 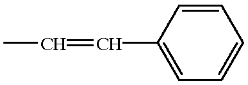 | 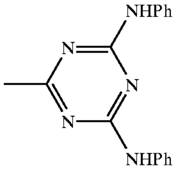 | Cu | 2 |
| I-38 | 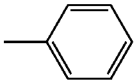 | 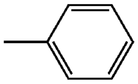 | 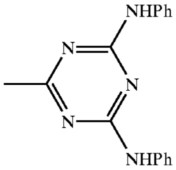 | Co | 3 |

TABLE 1-continued
(I)
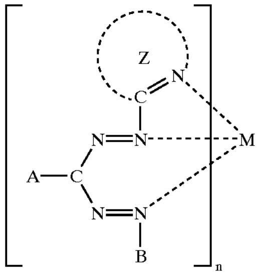
| Comp. No. | A | B | Z | M | n |
|---|---|---|---|---|---|
| I-39 | 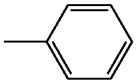 | 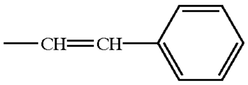 | 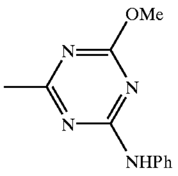 | Cu | 2 |
| I-40 | 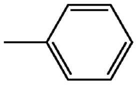 | 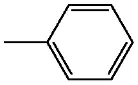 | 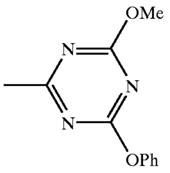 | Ni | 2 |
| I-41 | 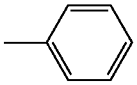 | 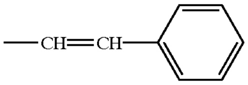 | 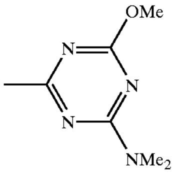 | Co | 2 |
| I-42 | 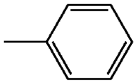 | 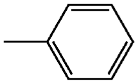 | 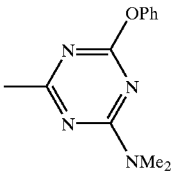 | Ni | 2 |
| I-43 | 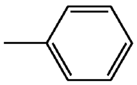 | 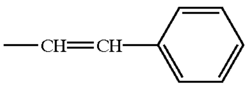 | 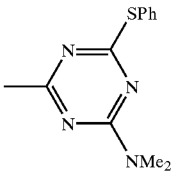 | Ni | 2 |
| I-44 | 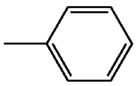 | 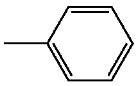 | 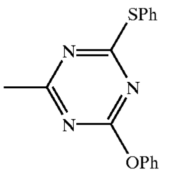 | Ni | 2 |

TABLE 1-continued (I)

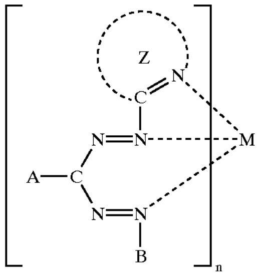

| Comp. No. | A | B | Z | M | n |
|---|---|---|---|---|---|
| I-45 | 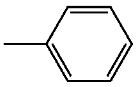 | 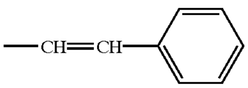 | 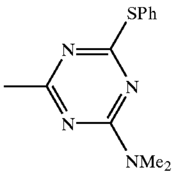 | Ni | 2 |
| I-46 | 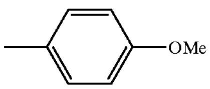 | 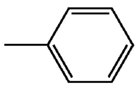 | 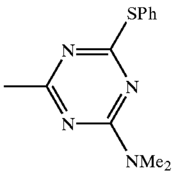 | Zn | 2 |

The formazan chelate compound of formula (II) is as follows:

(II)

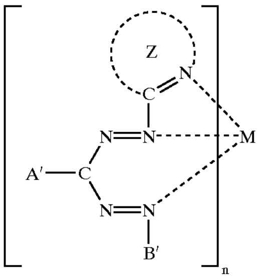

wherein Z represents a group that forms a polyheterocyclic ring with a carbon atom and a nitrogen atom that are bounded thereto; A' represents a five-membered ring or six-membered ring, or a group that constitutes the heterocyclic ring; B' is an aryl group or an alkyl group; M represents a bivalent metal atom; and n represents the coordination number of formazan ligands. Z in formula (II) is the same as that previously defined in formula (I).

Examples of the heterocyclic ring represented by A' in formula (II) include pyrrole ring, thiophene ring, thiazole ring, oxazole ring, pyrazole ring, imidazole ring, oxadiazole ring, triazole ring, thiadiazole ring, pyridazine ring, pyrimidine ring, pyrazine ring, and triazine ring. The heterocyclic ring represented by A' may have a substituent such as an alkyl group, an alkoxyl group, a thioalkoxyl group, a substituted amino group, an aryl group, an aryloxy group, anilino group, or a keto group.

As mentioned above, B' in formula (II) is an aryl group or an alkyl group. When B' is an aryl group, the same aryl groups as mentioned in the description of B in formula (I) can be used. When B' is an alkyl group, the same straight-chain or branched alkyl groups as mentioned in the description of formula (I) can be used.

In formula (II), B' may have a substituent such as an alkyl group, an alkoxyl group, a halogen atom, carboxyl group and an ester group thereof, nitrile group, or nitro group.

Examples of the alkyl group, alkoxyl group, aryl group, aryloxy group, and halogen atom, which serve as the substituents for A' or B' are the same as those mentioned in formula (I).

Examples of the bivalent metal atom represented by M in formula (II) are the same as mentioned in formula (I).

In formula (II), n represents the coordination number of formazan ligands. The coordination number is generally in the range of 1 to 3, preferably 2.

Specific examples of the formazan chelate compound of formula (II) are shown in TABLE 2.

TABLE 2
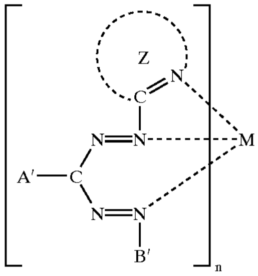
(II)
| Comp. No. | A' | B' | Z | M | n |
|---|---|---|---|---|---|
| II-1 | 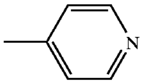 | 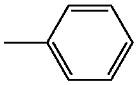 | 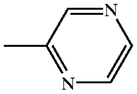 | Co | 3 |
| II-2 | 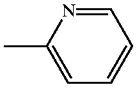 | 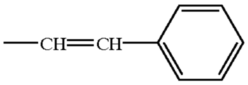 | 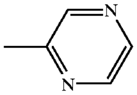 | Ni | 2 |
| II-3 | 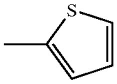 | $—CH(CH_3)_2$ | 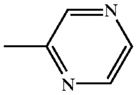 | Cu | 2 |
| II-4 | 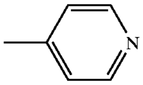 | 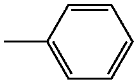 | 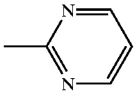 | Ni | 2 |
| II-5 | 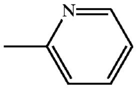 | 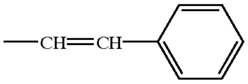 | 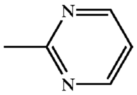 | Cr | 3 |
| II-6 | 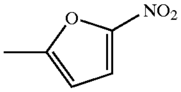 | $—CH(CH_3)_2$ | 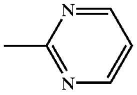 | Co | 2 |
| II-7 | 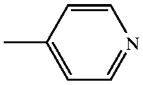 | $—CH(CH_3)_2$ | 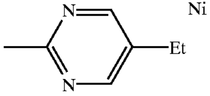 | Ni | 2 |
| II-8 | 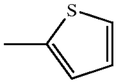 | 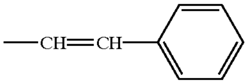 | 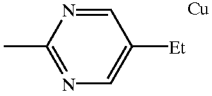 | Cu | 2 |
| II-9 | 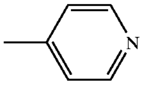 | 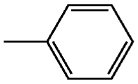 | 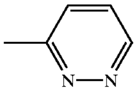 | Cu | 2 |
| II-10 | 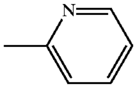 | $—CH(CH_3)_2$ | 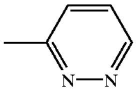 | Fe | 2 |

TABLE 2-continued
(II)
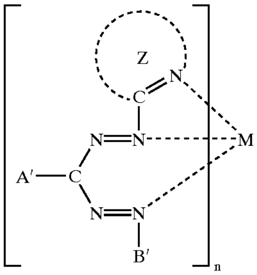
| Comp. No. | A' | B' | Z | M | n |
|---|---|---|---|---|---|
| II-11 | 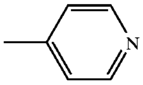 | 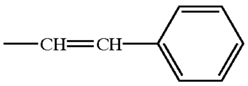 | 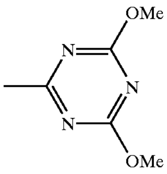 | Ni | 2 |
| II-12 | 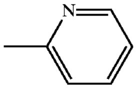 | 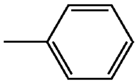 | 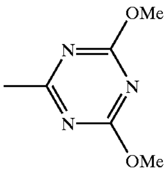 | Cr | 3 |
| II-13 | 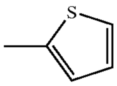 | 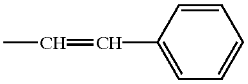 | 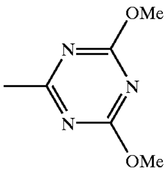 | Ni | 2 |
| II-14 | 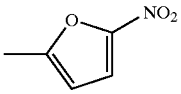 | 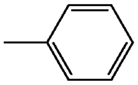 | 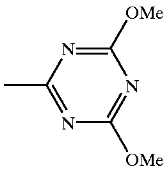 | Ni | 2 |
| II-15 | 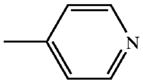 | $—CH(CH_3)_2$ | 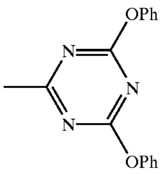 | Co | 2 |
| II-16 | 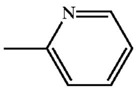 | 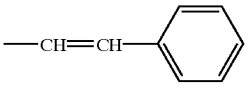 | 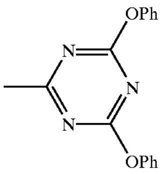 | Ni | 2 |

TABLE 2-continued
(II)
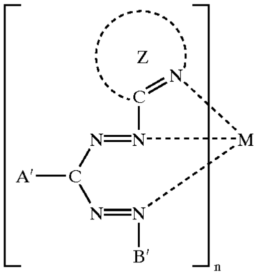
| Comp. No. | A' | B' | Z | M | n |
|---|---|---|---|---|---|
| II-17 | 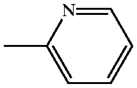 | 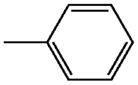 | 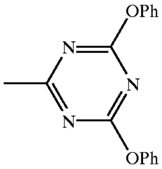 | Ni | 2 |
| II-18 | 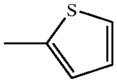 | 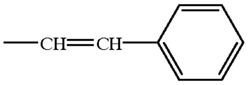 | 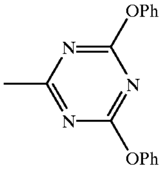 | Cu | 2 |
| II-19 | 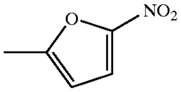 | 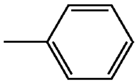 | 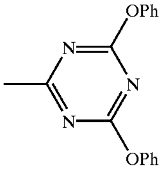 | Co | 2 |
| II-20 | 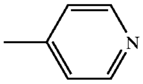 | $-CH(CH_3)_2$ | 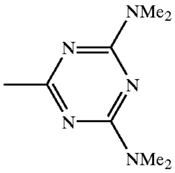 | Cu | 2 |
| II-21 | 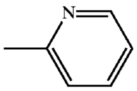 | 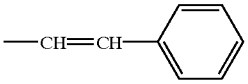 | 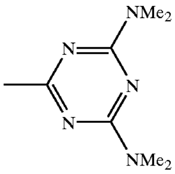 | Ni | 2 |
| II-22 | 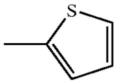 | 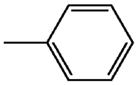 | 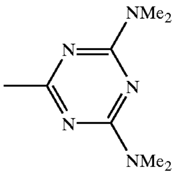 | Co | 2 |

TABLE 2-continued
(II)
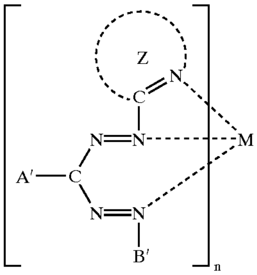
| Comp. No. | A' | B' | Z | M | n |
|---|---|---|---|---|---|
| II-23 | 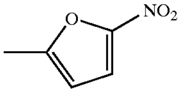 | —$CH(CH_3)_2$ | 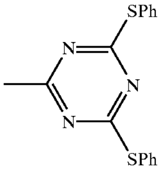 | Cr | 3 |
| II-24 | 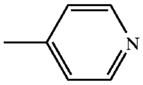 | 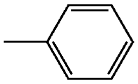 | 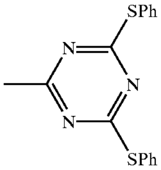 | Zn | 2 |
| II-25 | 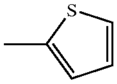 | 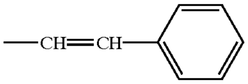 | 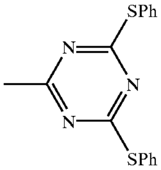 | Ni | 2 |
| II-26 | 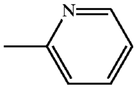 | 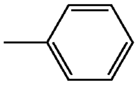 | 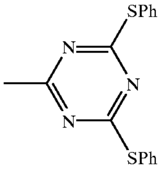 | Ni | 2 |
| II-27 | 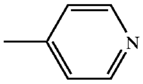 | 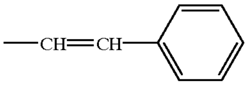 | 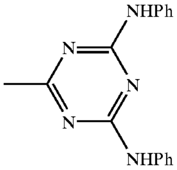 | Cu | 2 |
| II-28 | 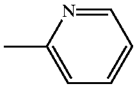 | 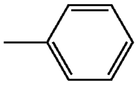 | 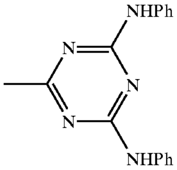 | Co | 3 |

TABLE 2-continued
(II)
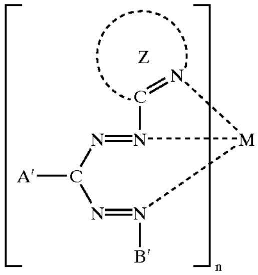
| Comp. No. | A' | B' | Z | M | n |
|---|---|---|---|---|---|
| II-29 | 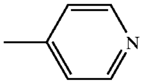 | 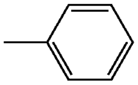 | 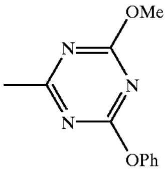 | Ni | 2 |
| II-30 | 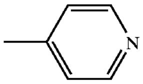 | 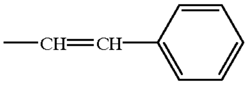 | 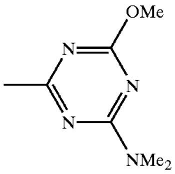 | Co | 2 |
| II-31 | 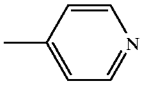 | 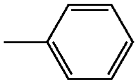 | 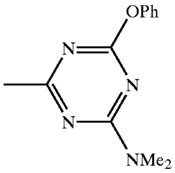 | Ni | 2 |
| II-32 | 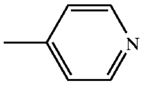 | 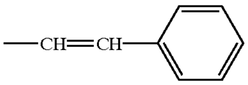 | 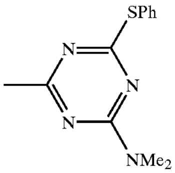 | Ni | 2 |
| II-33 | 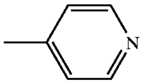 | 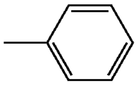 | 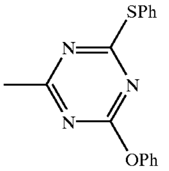 | Ni | 2 |
| II-34 | 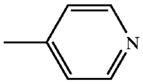 | 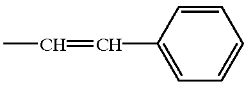 | 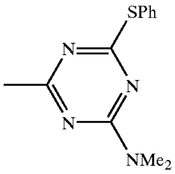 | Ni | 2 |

The formazan chelate compound of formula (III) is as follows:

(III)

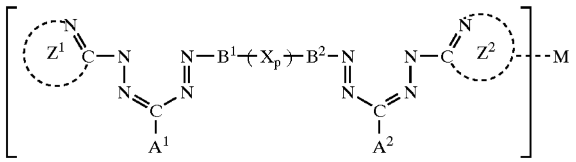

wherein $Z^1$ and $Z^2$ are each a group that forms a heterocyclic ring with a carbon atom and a nitrogen atom that are bounded thereto; $A^1$ and $A^2$ are each an alkyl group, an aralkyl group, an aryl group, or cyclohexyl group; $B^1$ and $B^2$ are each an aryl group; p is an integer of 0 or 1, and when p is 1, X is methylene group, or sulfone group; and M represents a bivalent metal atom.

Examples of the heterocyclic ring of $Z^1$ and $Z^2$ include thiazole ring, benzothiazole ring, oxazole ring, benzoxazole ring, pyrazole ring, benzopyrazole ring, imidazole ring, benzimidazole ring, oxadiazole ring, pyridine ring, triazole ring, thiadiazole ring, pyridazine ring, pyrimidine ring, pyrazine ring, triazine ring, naphthalidine ring, cinnoline ring, quinazoline ring, quinoxaline ring, and phenazine ring. Preferred are pyridine ring, pyridazine ring, pyrimidine ring, pyrazine ring, and triazine ring in view of optical properties, storage stability, and light resistance.

The heterocyclic ring of $Z_1$ and $Z^2$ may have a substituent such as an alkyl group, an alkoxyl group, a thioalkoxyl group, a substituted amino group, an aryl group, an aryloxy group, anilino group, or a keto group.

As mentioned above, $B^1$ and $B^2$ in formula (III) are each an aryl group. In this case, the same aryl groups as described in the definition of B in formula (I).

In formula (III), $B_1$ and $B^2$ may have a substituent such as an alkyl group, an alkoxyl group, a halogen atom, carboxyl group and an ester group thereof, nitrile group, or nitro group.

Examples of the alkyl group, alkoxyl group, aryl group, aryloxy group, and halogen atom in formula (III) are the same as those mentioned n formula (I).

Examples of the bivalent metal atom represented by M in formula (III) are the same as mentioned in formula (I).

Specific examples of the formazan chelate compound of formula (III) are shown in TABLE 3.

TABLE 3
(III)
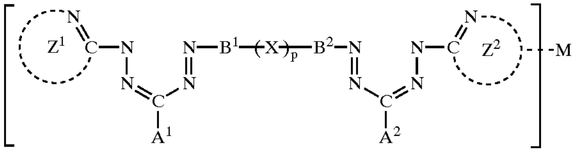
| Comp. No. | $A^1$ | $A^2$ | $B^1$ | $B^2$ | $Z^1$ | $Z^2$ | X | M |
|---|---|---|---|---|---|---|---|---|
| III-1 | $—CH(CH_3)_2$ | $—CH(CH_3)_2$ |  | 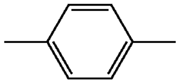 | 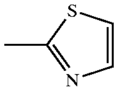 | 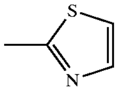 | $—CH_2—$ | Ni |
| III-2 | 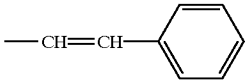 | 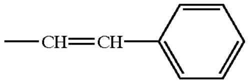 |  | 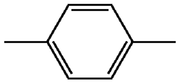 | 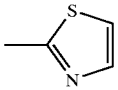 | 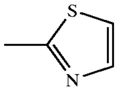 | $—CH_2—$ | Cu |
| III-3 | 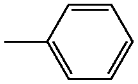 | 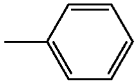 |  |  | 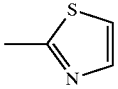 | 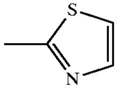 | $—SO_2—$ | Zn |
| III-4 | $—CH(CH_3)_2$ | $—CH(CH_3)_2$ |  |  | 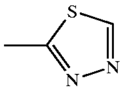 | 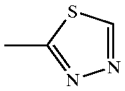 | $—CH_2—$ | Ni |
| III-5 | 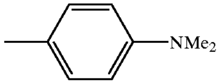 | 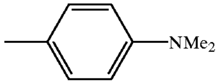 |  | 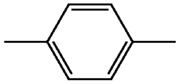 | 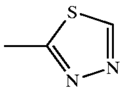 | 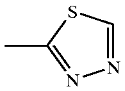 | — | Zn |
| III-6 | 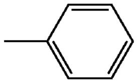 | 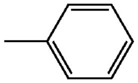 |  | 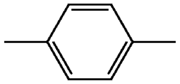 | 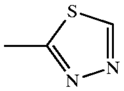 | 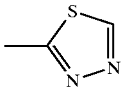 | $—CH_2—$ | Ni |
| III-7 | $—CH(CH_3)_2$ | $—CH(CH_3)_2$ | 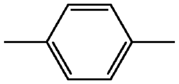 |  | 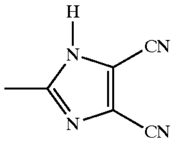 | 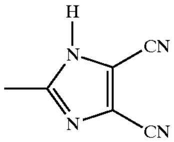 | $—CH_2—$ | Cu |

TABLE 3-continued
(III)
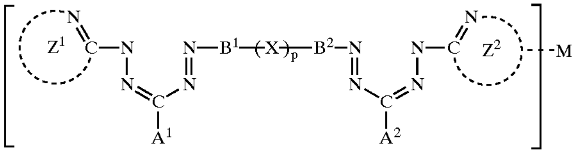
| Comp. No. | A¹ | A² | B¹ | B² | Z¹ | Z² | X | M |
|---|---|---|---|---|---|---|---|---|
| III-8 | 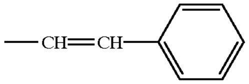 | 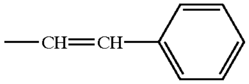 |  | 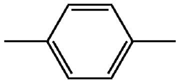 | 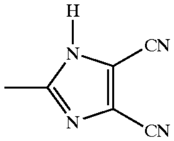 | 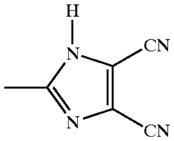 | $—CH_2—$ | Co |
| III-9 | 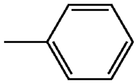 | 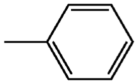 |  |  | 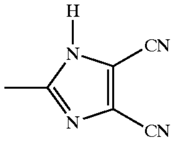 | 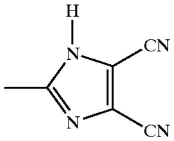 | — | Ni |
| III-10 | 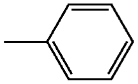 | 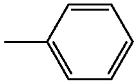 |  |  | 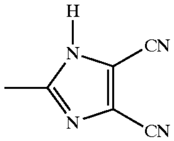 | 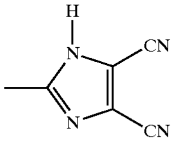 | $—SO_2—$ | Ni |
| III-11 | $—CH(CH_3)_2$ | $—CH(CH_3)_2$ |  |  | 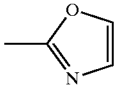 | 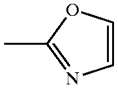 | $—CH_2—$ | Zn |
| III-12 | 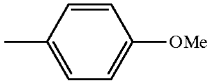 | 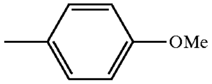 |  |  | 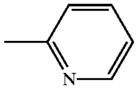 | 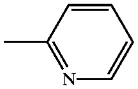 | $—CH_2—$ | Ni |
| III-13 | $—CH(CH_3)_2$ | $—CH(CH_3)_2$ |  |  | 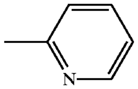 | 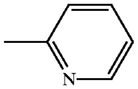 | — | Cu |

TABLE 3-continued
(III)
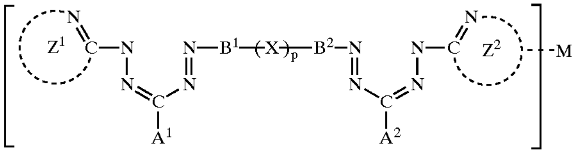
| Comp. No. | $A^1$ | $A^2$ | $B^1$ | $B^2$ | $Z^1$ | $Z^2$ | X | M |
|---|---|---|---|---|---|---|---|---|
| III-14 | 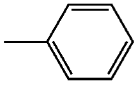 | 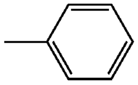 |  |  | 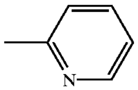 | 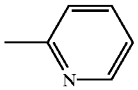 | $—SO_2—$ | Ni |
| III-15 | 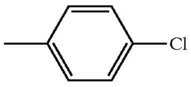 | 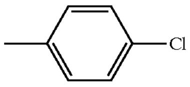 | 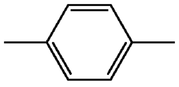 | 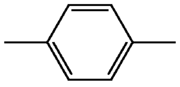 | 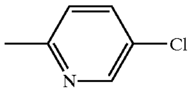 | 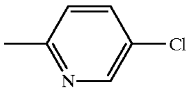 | $—CH_2—$ | Cr |
| III-16 | 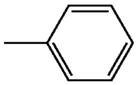 | 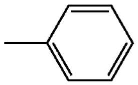 |  |  | 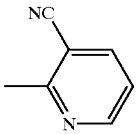 | 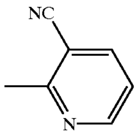 | — | Co |
| III-17 | $—CH(CH_3)_2$ | $—CH(CH_3)_2$ |  |  | 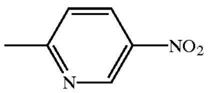 | 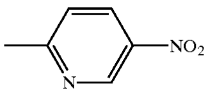 | $—CH_2—$ | Ni |
| III-18 | 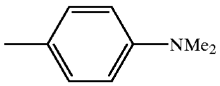 | 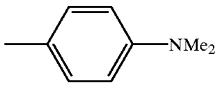 |  |  | 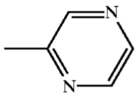 | 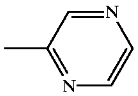 | $—CH_2—$ | Zn |
| III-19 | $—CH(CH_3)_2$ | $—CH(CH_3)_2$ |  |  | 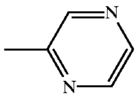 | 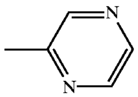 | $—SO_2—$ | Cu |
| III-20 | 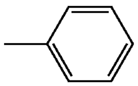 | 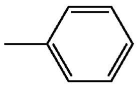 |  |  | 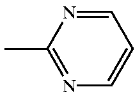 | 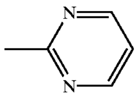 | $—CH_2—$ | Fe |

TABLE 3-continued
(III)
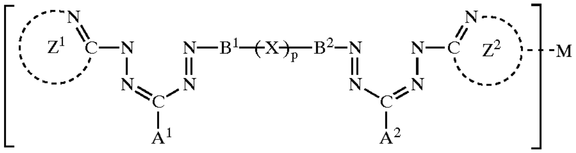
| Comp. No. | $A^1$ | $A^2$ | $B^1$ | $B^2$ | $Z^1$ | $Z^2$ | X | M |
|---|---|---|---|---|---|---|---|---|
| III-21 | 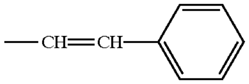 | 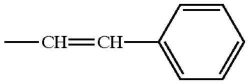 |  | 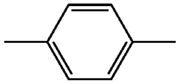 | 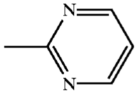 | 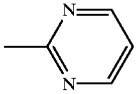 | — | Ni |
| III-22 | 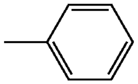 | 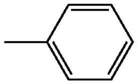 |  |  | 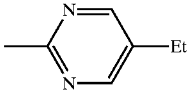 | 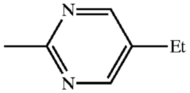 | $—CH_2—$ | Cr |
| III-23 | 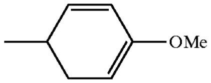 | 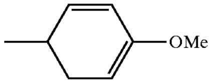 |  |  | 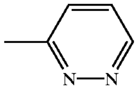 | 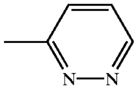 | $—CH_2—$ | Ni |
| III-24 | 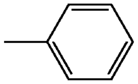 | 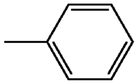 |  | 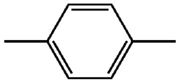 | 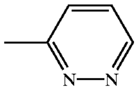 | 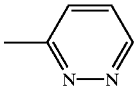 | — | Ni |
| III-25 | $—CH(CH_3)_2$ | $—CH(CH_3)_2$ |  | 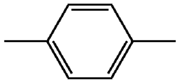 | 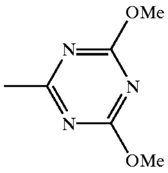 | 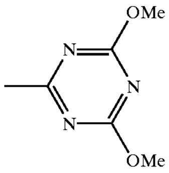 | $—CH_2—$ | Co |
| III-26 | 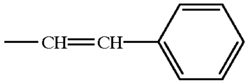 | 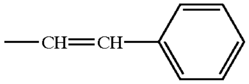 |  |  | 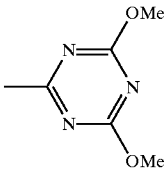 | 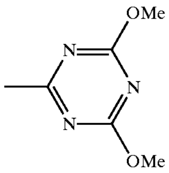 | — | Ni |

TABLE 3-continued
(III)
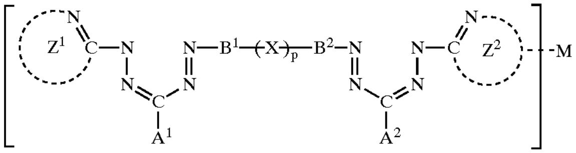
| Comp. No. | $A^1$ | $A^2$ | $B^1$ | $B^2$ | $Z^1$ | $Z^2$ | X | M |
|---|---|---|---|---|---|---|---|---|
| III-27 | 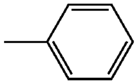 | 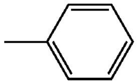 |  | 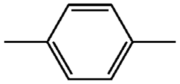 | 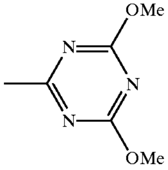 | 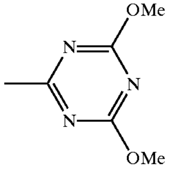 | $—SO_2—$ | Ni |
| III-28 | 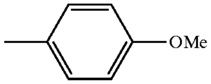 | 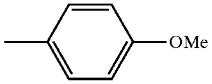 |  | 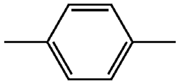 | 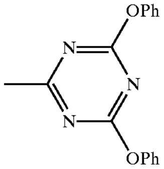 | 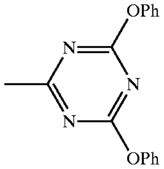 | $—CH_2—$ | Cu |
| III-29 | 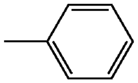 | 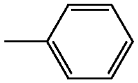 | 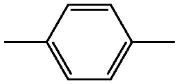 |  | 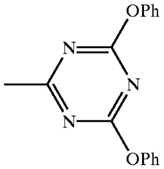 | 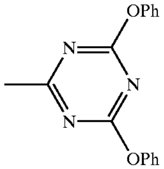 | $—CH_2—$ | Co |
| III-30 | 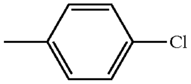 | 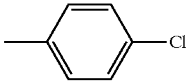 | 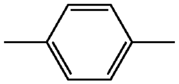 |  | 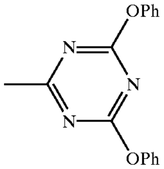 | 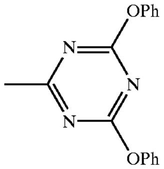 | — | Cu |

TABLE 3-continued
(III)
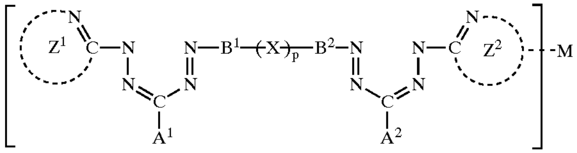
| Comp. No. | $A^1$ | $A^2$ | $B^1$ | $B^2$ | $Z^1$ | $Z^2$ | X | M |
|---|---|---|---|---|---|---|---|---|
| III-31 | 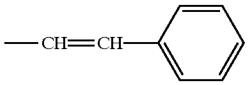 | 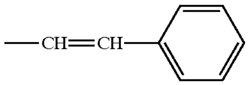 |  | 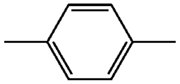 | 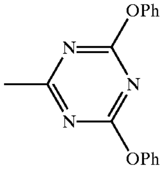 | 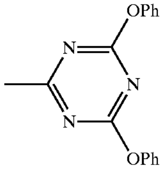 | — | Ni |
| III-32 | 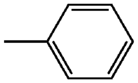 | 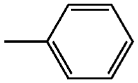 |  | 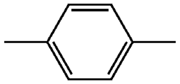 | 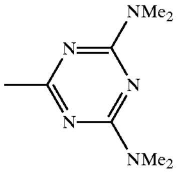 | 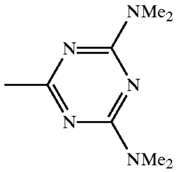 | $-CH_2-$ | Zn |
| III-33 | 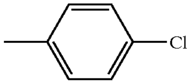 | 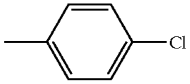 |  |  | 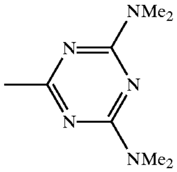 | 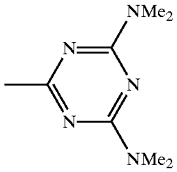 | $-CH_2-$ | Cr |
| III-34 | $-CH(CH_3)_2$ | $-CH(CH_3)_2$ |  | 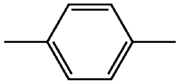 | 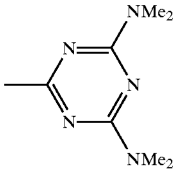 | 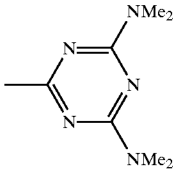 | — | Zn |

TABLE 3-continued
(III)
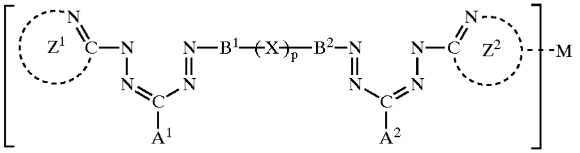
| Comp. No. | A¹ | A² | B¹ | B² | Z¹ | Z² | X | M |
|---|---|---|---|---|---|---|---|---|
| III-35 | 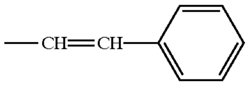 | 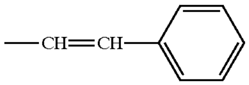 |  | 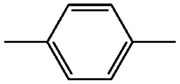 | 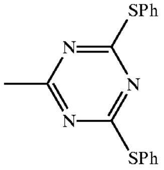 | 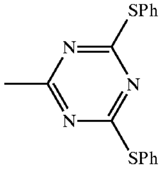 | $—CH_2—$ | Ni |
| III-36 | 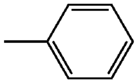 | 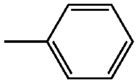 |  | 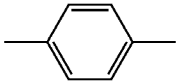 | 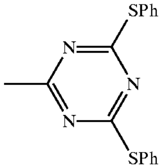 | 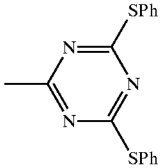 | $—SO_2—$ | Ni |
| III-37 | 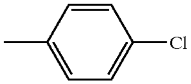 | 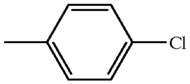 | 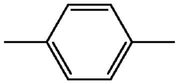 |  | 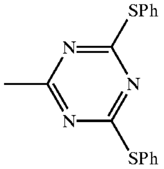 | 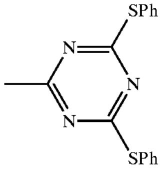 | $—CH_2—$ | Cu |
| III-38 | 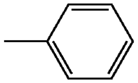 | 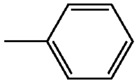 | 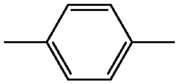 | 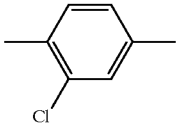 | 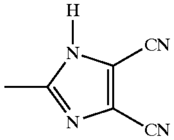 | 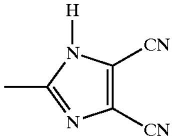 | $—CH_2—$ | Co |

TABLE 3-continued
(III)
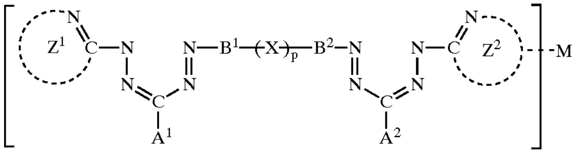
| Comp. No. | A¹ | A² | B¹ | B² | Z¹ | Z² | X | M |
| --- | --- | --- | --- | --- | --- | --- | --- | --- |
| III-39 | 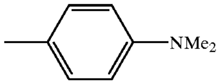 | 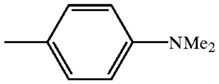 |  | 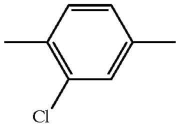 | 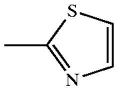 | 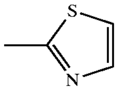 | — | Cu |
| III-40 | 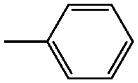 | 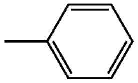 |  | 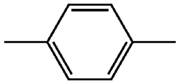 | 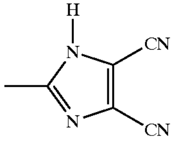 | 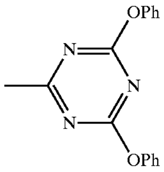 | $-CH_2-$ | Ni |
| III-41 | 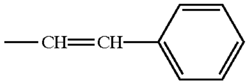 | 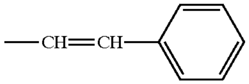 |  | 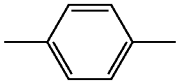 | 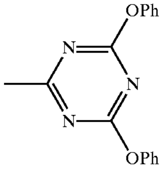 | 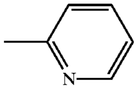 | $-CH_2-$ | Co |
| III-42 | 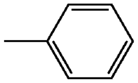 | 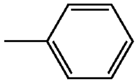 |  | 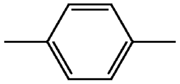 | 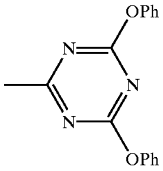 | 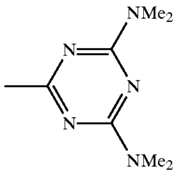 | $-CH_2-$ | Ni |

TABLE 3-continued
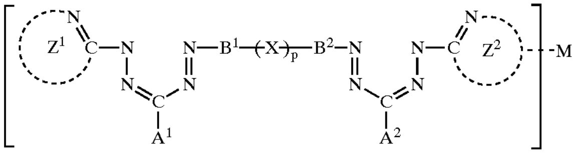
(III)
| Comp. No. | $A^1$ | $A^2$ | $B^1$ | $B^2$ | $Z^1$ | $Z^2$ | X | M |
|---|---|---|---|---|---|---|---|---|
| III-43 | 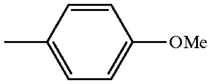 | 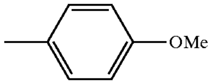 |  | 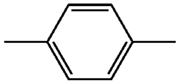 | 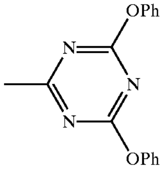 | 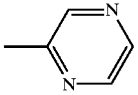 | $—CH_2—$ | Ni |
| III-44 | 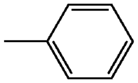 | 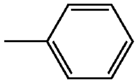 |  | 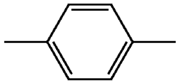 | 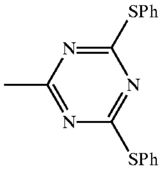 | 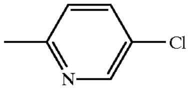 | $—CH_2—$ | Zn |
| III-45 | 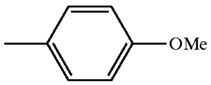 | 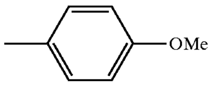 | 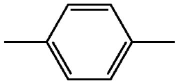 |  | 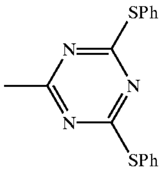 | 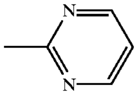 | — | Ni |
| III-46 | 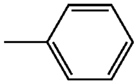 | 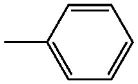 |  |  | 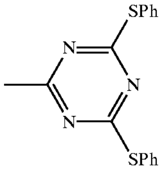 | 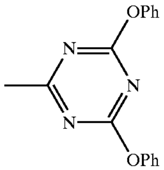 | $—CH_2—$ | Zn |

The formazan chelate dyes of formulas (I), (II), and (III) may be used in combination.

The recording layer for use in the present invention may further comprise an organic dye, metal, or metal compound in order to enhance the optical properties, recording sensitivity, and signal characteristics. Such an organic dye, metal or metal compound may be mixed with the formazan chelate dye for use in the present invention. Alternatively, a layer comprising the organic dye, metal or a metal compound may be additionally prepared, and attached to the previously mentioned recording layer.

Examples of the above-mentioned organic dye are polymethine dye, naphthalocyanine dye, phthalocyanine dye, squarylium dye, croconium dye, pyrylium dye, naphthoquinone dye, anthraquinone (indanthrene) dye, xanthene dye, triphenylmethane dye, azulene dye, tetrahydrocholine dye, phenanthrene dye, and triphenothiazine dye; and metal complex compounds of the above-mentioned dyes.

Examples of the above-mentioned metals and metal compounds for use in the recording layer are In, Te, Bi, Se, Sb, Ge, Sn, Al, Be, $TeO_2$, SnO, As, and Cd. These metals and metal compounds may be dispersed in combination with the above-mentioned dyes in the recording layer, or prepared into a layer of the metal or metal compound.

The formazan chelate dyes for use in the present invention can effectively work as a light stabilizer. In this case, the recording layer may further comprise a light absorbing dye, which exhibits a maximum absorption wavelength a in the range of 550 to 650 nm. In light of light stabilizing effect, it is preferable that there is a relationship between the maximum absorption wavelength a and a maximum absorption wavelength b of the formazan chelate compound being $b>a-50$.

Examples of the above-mentioned light abosorbing dyes for use in the present invention are polymethine dye, naphthalocyanine dye, phthalocyanine dye, squarylium dye, croconium dye, pyrylium dye, naphthoquinone dye, anthraquinone (indanthrene) dye, xanthene dye, triphenylmethane dye, azulene dye, tetrahydrocholine dye, phenanthrene dye, triphenothiazine dye, and azo chelate dye. Of these light absorbing dyes, polymethine dye, squarylium dye, and azo chelate dye are preferable. Further cyanine dye, one of the polymethine dyes, is more preferable.

Further, various materials, for example, polymers such as ionomer resin, polyamide resin, vinyl resin, natural polymer, silicone, and liquid rubber, or a silane coupling agent may be dispersed in combination with the previously mentioned dyes.

In addition, to improve the characteristics of the recording layer, the recording layer may further comprise a stabilizer (for example, a transition metal complex), a dispersant, a fire retardant, a lubricant, an antistatic agent, a surfactant, and a plasticizer.

The recording layer can be formed by any of the conventional methods such as deposition, sputtering, chemical vapor deposition (CVD), and solvent coating.

When the coating method is employed for the formation of the recording layer, the formazan chelate dye, optionally in combination with other materials, may be dissolved in an organic solvent to prepare a coating liquid, and the coating liquid for the recording layer thus prepared may be coated, for instance, on the substrate by the conventional coating method such as spray coating, roller coating, dip coating, or spinner coating.

Specific examples of the organic solvent used for the preparation of the coating liquid for the recording layer include alcohols such as methanol, ethanol, and isopropanol, and fluorinated alcohols; ketones such as acetone, methyl ethyl ketone, and cyclohexanone; amides such as N,N-dimethylacetamide and N,N-dimethylformamide; sulfoxide such as dimethylsulfoxide; ethers such as tetrahydrofuran, dioxane, diethyl ether, and ethylene glycol monomethyl ether; esters such as methyl acetate and ethyl acetate; aliphatic halogenated hydrocarbons such as chloroform, methylene chloride, dichloroethane, carbon tetrachloride, and trichloroethane; aromatic compounds such as benzene, xylene, monochlorobenzene, and dichlorobenzene; cellosolves such as methoxyethanol and ethoxyethanol; and hydrocarbons such as hexane, pentane, cyclohexane, and methylcyclohexane.

It is preferable that the recording layer have a thickness in the range of 100 Å to 10 μm, more preferably in the range of 200 Å to 2000 Å.

<Undercoat Layer>

The undercoat layer may be interposed between the substrate and the recording layer for the following purposes: (a) improving the adhesion between the substrate and the recording layer; (b) preventing the recording layer from being exposed to water and gases as a barrier layer; (c) improving the preservation stability of the recording layer; (d) increasing the reflectance of the recording layer; (e) protecting the substrate from the solvent employed; and (f) forming guide grooves, guide pits and pregrooves and the like.

To attain the above-mentioned purpose (a), a variety of polymeric materials such as ionomer resin, polyamide resin, vinyl resin, natural resins, natural polymeric materials, silicone, and liquid rubber; and a silane coupling agent may be employed.

To attain the purposes (b) and (c), inorganic compounds such as $SiO_2$, $MgF_2$, SiO, TiO, ZnO, TiN, and SiN; and metals such as Zn, Cu, Ni, Cr, Ge, Se, Au, Ag, and Al and semimetals can be used in addition to the above-mentioned polymeric materials.

To attain the purpose (d), a metal such as Al, Au, or Ag may be used for the formation of the undercoat layer; or an organic thin film exhibiting metallic luster may be formed by using, for example, methine dye or xanthene dye.

To attain the purposes (e) and (f), an ultraviolet-curing resin, a thermosetting resin, and a thermoplastic resin can be used for the formation of the undercoat layer.

It is preferable that the undercoat layer have a thickness in the range of 0.01 to 30 μm, more preferably in the range of 0.05 to 10 μm.

<Reflection Layer>

The reflection layer for use in the present invention may be made of a metal or a semimetal which exhibits high reflectance by itself and is insusceptible to corrosion.

Specific examples of the metal for use in the reflection layer are Au, Ag, Al, Cr, Ni, Fe, and Sn. Of these metals, Au, Ag, and Al are particularly preferable in view of the reflectance and the productivity. These metals and semimetals may be used alone, or in combination to prepare an alloy.

The reflection layer can be formed by the conventional film formation method such as deposition or sputtering. It is preferable that the reflection layer have a thickness in the range of 50 to 5000 Å, more preferably in the range of 100 to 3000 Å.

<Protective Layer and Hard Coat layer>

The protective layer is provided on the reflection layer, and a hard coat layer is provided on the back side of the substrate, opposite to the recording layer side with respect to the substrate. The hard coat layer is provided to improve scratch resistance of the surface of the substrate. The protective layer serves to (a) protect the recording layer (or the reflection layer) from damage, dust, and soiling, (b) improve the storage stability of the recording layer (or the reflection layer), and (c) improve the reflectance. The hard coat layer is provided to protect the rear surface of the substrate from damage, dust, and soiling. For these purposes, the same materials as used for the undercoat layer are available in the preparation of the protective layer and the hard coat layer.

For instance, specific examples of the material for the protective layer and the hard coat layer include inorganic materials, such as SiO and $SiO_2$; and organic materials, such as heat-softening and heat-fusible resins, e.g. poly(methyl acrylate), polycarbonate, epoxy resin, polystyrene, polyester resin, vinyl resin, cellulose, aliphatic hydrocarbon resin, natural rubber, styrene-butadiene resin, chloroprene rubber, wax, alkyd resin, drying oil, and rosin, and ultraviolet-curing resins.

Of the above-mentioned resins for use in the protective layer and the hard coat layer, most preferable are the ultraviolet-curing resin, for example, radical polymerization type resins, such as acrylic resin, unsaturated polyester resin, and unsaturated polyurethane resin; and cationic photopolymerization type resins such as aryl diazoniurn salts, diaryl iodonium salts, dialkyl phenacyl sulfonium salts, and sulfonate since such ultraviolet-curing resins are excellent in productivity.

It is proper that the protective layer or the hard coat layer have a thickness in the range of 0.01 to 30 μm, more preferably in the range of 0.05 to 10 μm.

The protective layer and the hard coat layer may further comprise auxiliary agents such as a stabilizer, a dispersant, a fire retardant, a lubricant, an antistatic agent, a surfactant, and a plasticizer.

Other features of this invention will become apparent in the course of the following description of exemplary embodiments, which are given for illustration of the invention and are not intended to be limiting thereof.

EXAMPLE I-1

A guide groove with a depth of 1600 Å, a half width of 0.30 μm, and a track pitch of 0.8 μm was formed on one surface of an injection molded polycarbonate substrate with a thickness of 0.6 mm. Compound No. I-15 shown in TABLE 1 was dissolved in tetrafluoropropanol, and the thus obtained solution of the compound No. I-15 was applied to the above prepared substrate by spinner coating, whereby a recording layer with a thickness of 700 Å was provided on the substrate. A gold reflection layer with a thickness of 2000 Å was then formed on the recording layer by sputtering. A protective layer with a thickness of 10 μm was further provided on the reflection layer using an acrylic photopholymer.

Thus, an optical recording medium No. 1 according to the present invention was obtained.

EXAMPLES I-2 to I-8

The procedure for preparation of the optical recording medium No. 1 in Example I-1 was repeated except that the compound No. I-15 for use in the recording layer in Example I-1 was replaced by the compounds Nos. I-9, I-11, I-12, I-18, I-24, I-32, and I-40, respectively in Examples I-2 to I-8.

Thus, optical recording media No. 2 to No. 8 according to the present invention were obtained.

Comparative Example I-1

The procedure for preparation of the optical recording medium No. 1 in Example I-1 was repeated except that the compound No. I-15 for use in the recording layer in Example I-1 was replaced by the following compound No. C-1. Thus, a comparative optical recording medium No. 1 was obtained.

(C-1)

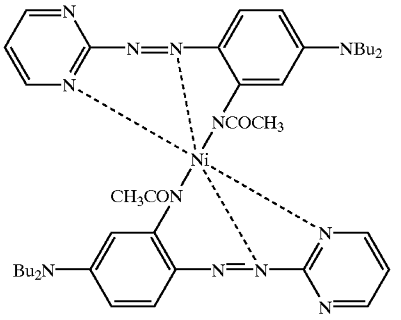

Comparative Example I-2

The procedure for preparation of the optical recording medium No. 1 in Example I-1 was repeated except that the compound No. I-15 for use in the recording layer in Example I-1 was replaced by the following compound No. C-2. Thus, a comparative optical recording medium No. 2 was obtained.

(C-2)

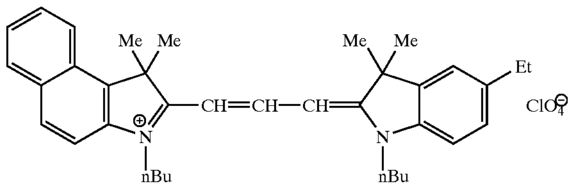

To evaluate the recording and reproducing characteristics of each of the above prepared optical recording media Nos. 1 to 8 according to the present invention and comparative optical recording media Nos. 1 and 2, EFM signals were recorded in each recording medium by applying a semiconductor laser beam with a wavelength of 635 nm to each recording medium, while tracking was conducted, under the conditions that the recording linear speed was set at 3.0 m/sec and the shortest mark length was 0.4 μm.

Then, the recorded signals were reproduced using a continuous wave laser beam with a wavelength of 650 nm by the application of a reproduction power of 0,7 mW. The reflectance and the ratio of carrier to noise (C/N) initially obtained from each recording medium was measured.

A light resistance test was conducted in such a manner that each recording medium was caused to deteriorate by being continuously exposed to a tungsten lamp of 50,000 lux for 20 hours. After the light exposure, the reflectance and the C/N ratio of each recording medium were measured in the same manner as mentioned above.

The results are shown in TABLE 4.

TABLE 4

| | At Initial Stage | | After Light Resistance Test | |
|---|---|---|---|---|
| | Reflectance (%) | C/N (dB) | Reflectance (%) | C/N (dB) |
| Ex. I-1 | 54 | 55 | 53 | 53 |
| Ex. I-2 | 53 | 54 | 51 | 51 |
| Ex. I-3 | 54 | 55 | 52 | 52 |
| Ex. I-4 | 52 | 53 | 53 | 53 |
| Ex. I-5 | 55 | 56 | 53 | 52 |
| Ex. I-6 | 54 | 56 | 53 | 53 |
| Ex. I-7 | 52 | 54 | 50 | 51 |
| Ex. I-8 | 51 | 53 | 50 | 51 |
| Comp. Ex. I-1 | 56 | 56 | 46 | 35 |
| Comp. Ex. I-2 | 66 | 57 | 52 | impossible to measure |

EXAMPLE I-9

A mixture of the compound No. C-1 used in Comparative Example I-1 and compound No. I-36 shown in TABLE 1 with a mixing ratio by weight of 10:1.5 was dissolved in tetrafluoropropanol. The thus obtained solution was applied to an injection molded polycarbonate substrate with a thickness of 1.2 mm by spinner coating.

Thus, a recording layer (a) with a thickness of 1000 Å for use in the present invention was formed on the substrate.

EXAMPLE I-10

The procedure for formation of the recording layer (a) in Example I-9 was repeated except that the mixing ratio of 10:1.5 of the mixture in Example I-9 was changed to 10:3.

Thus, a recording layer (b) for use in the present invention was formed.

EXAMPLE I-11

The procedure for formation of the recording layer (a) in Example I-9 was repeated except that the compound No. C-1 used in Example I-9 was replaced by the compound No. C-2 used in Comparative Example I-2.

Thus, a recording layer (c) for use in the present invention was formed.

EXAMPLE I-12

The procedure for formation of the recording layer (b) in Example I-10 was repeated except that the compound No. C-1 used in Example I-10 was replaced by the compound No. C-2 used in Comparative Example I-2.

Thus, a recording layer (d) for use in the present invention was formed.

Comparative Example I-3

The procedure for formation of the recording layer (a) in Example I-9 was repeated except that the compound No. I-36 used in Example I-9 was not employed for the formation of the recording layer.

Thus, a comparative recording layer (e) was formed.

Comparative Example I-4

The procedure for formation of the recording layer (c) in Example I-11 was repeated except that the compound No. I-36 used in Example I-11 was not employed for the formation of the recording layer.

Thus, a comparative recording layer (f) was formed.

The absorbance of each of the recording layers (a) to (f) formed in Examples I-9 to I-12 and Comparative Examples I-3 and I-4 was measured immediately after the recording layer was exposed to a tungsten lamp of 50,000 lux, and 10, 50, and 100 hours later in the light resistance test.

The results are shown in TABLE 5.

TABLE 5

| | Absorbance of Recording Layer (*) | | | |
|---|---|---|---|---|
| | Initial stage | After 10 h. | After 50 h. | After 100 h. |
| Ex. I-9 | 1.00 | 0.908 | 0.622 | 0.381 |
| Ex. I-10 | 1.00 | 0.944 | 0.765 | 0.581 |
| Ex. I-11 | 1.00 | 0.733 | 0.212 | 0.052 |
| Ex. I-12 | 1.00 | 0.846 | 0.435 | 0.192 |
| Comp. Ex. I-3 | 1.00 | 0.644 | 0.114 | 0.015 |
| Comp. Ex. I-4 | 1.00 | 0.109 | ~0 | ~0 |

(*) The absorbance with time is expressed relative to the initial absorbance.

When each of compounds Nos I-8, I-13, I-16, I-19, I-29, I-35 and I-46 was used instead of the compound No. I-36 in Example I-9, similar light stabilizing effects were obtained.

EXAMPLE II-1

A guide groove with a depth of 1600 Å, a half width of 0.30 μm, and a track pitch of 0.8 μm was formed on one surface of an injection molded polycarbonate substrate with a thickness of 0.6 mm. Compound No. II-1 shown in TABLE 2 was dissolved in tetrafluoropropanol, and the thus obtained solution of the compound No. II-1 was applied to the above prepared substrate by spinner coating, whereby a recording layer with a thickness of 700 Å was provided on the substrate. A gold reflection layer with a thickness of 2000 Å was then formed on the recording layer by sputtering. A protective layer with a thickness of 10 μm was further provided on the reflection layer using an acrylic photopolymer. Then, another injection molded polycarbonate substrate with a thickness of 0.6 mm was attached to the protective layer with an acrylic photopolymer interposed therebetween.

Thus, an optical recording medium No. 9 according to the present invention was obtained.

EXAMPLE II-2

The procedure for preparation of the optical recording medium No. 9 in Example II-1 was repeated except that the compound No. II-1 for use in the recording layer in Example II-1 was replaced by compound No. II-4 shown in TABLE 2.

Thus, an optical recording medium No. 10 according to the present invention was obtained.

EXAMPLE II-3

The procedure for preparation of the optical recording medium No. 9 in Example II-1 was repeated except that the compound No. II-1 for use in the recording layer in Example II-1 was replaced by compound No. II-24 shown in TABLE 2.

Thus, an optical recording medium No. 11 according to the present invention was obtained.

EXAMPLE II-4

The procedure for preparation of the optical recording medium No. 9 in Example II-1 was repeated except that the compound No. II-1 for use in the recording layer in Example II-1 was replaced by compound No. II-26 shown in TABLE 2.

Thus, an optical recording medium No. 12 according to the present invention was obtained.

Comparative Example II-1

The procedure for preparation of the optical recording medium No. 9 in Example II-1 was repeated except that the compound No. II-1 for use in the recording layer in Example II-1 was replaced by the compound No. C-1 described above.

Thus, a comparative optical recording medium No. 3 was obtained.

Comparative Example II-2

The procedure for preparation of the optical recording medium No. 9 in Example II-1 was repeated except that the compound No. II-1 for use in the recording layer in Example II-1 was replaced by the compound No. C-2 described above.

Thus, a comparative optical recording medium No. 4 was obtained.

To evaluate the recording and reproducing characteristics of each of the above prepared optical recording media Nos. 9 to 12 according to the present invention and comparative optical recording media Nos. 3 and 4, EFM signals were recorded in each recording medium by applying a semiconductor laser beam with a wavelength of 658 nm to each recording medium, while tracking was conducted, under the conditions that the recording linear speed was set at 3.0 m/sec and the shortest mark length was 0.4 $\mu$m.

Then, the recorded signals were reproduced using a continuous wave laser beam with a wavelength of 650 nm by the application of a reproduction power of 0.7 mW. The reflectance and the ratio of carrier to noise (C/N) initially obtained from each recording medium was measured.

A light resistance test was conducted in such a manner that each recording medium was caused to deteriorate by being continuously exposed to a tungsten lamp of 50,000 lux for 20 hours After the light exposure, the reflectance and the C/N ratio of each recording medium were measured in the same manner as mentioned above.

The results are shown in TABLE 6.

TABLE 6

| | At Initial Stage | | After Light Resistance Test | |
|---|---|---|---|---|
| | Reflectance (%) | C/N (dB) | Reflectance (%) | C/N (dB) |
| Ex. II-1 | 57 | 53 | 55 | 51 |
| Ex. II-2 | 56 | 54 | 55 | 52 |
| Ex. II-3 | 55 | 53 | 53 | 50 |
| Ex. II-4 | 56 | 53 | 54 | 51 |
| Comp. Ex. II-1 | 56 | 56 | 46 | 35 |
| Comp. Ex. II-2 | 66 | 57 | 52 | impossible to measure |

EXAMPLE II-5

A mixture of the compound No. C-1 used in Comparative Example II-1 and compound No. II-4 shown in TABLE 2 with a mixing ratio by weight of 10:2 was dissolved in tetrafluoropropanol. The thus obtained solution was applied to an injection molded polycarbonate substrate with a thickness of 1.2 mm by spinner coating.

Thus, a recording layer (g) with a thickness of 1000 Å for use in the present invention was formed on the substrate.

EXAMPLE II-6

The procedure for formation of the recording layer (g) in Example II-5 was repeated except that a mixing ratio of 10:2 of the mixture in Example II-5 was changed to 10:4.

Thus, a recording layer (h) for use in the present invention was formed.

EXAMPLE II-7

The procedure for formation of the recording layer (g) in Example II-5 was repeated except that the compound No. C-1 was replaced by the compound No. C-2 used in Comparative Example II-2.

Thus, a recording layer (i) for use in the present invention was formed.

EXAMPLE II-8

The procedure for formation of the recording layer (h) in Example II-6 was repeated except that the compound No. C-1 was replaced by the compound No. C-2 used in Comparative Example II-2.

Thus, a recording layer (j) for use in the present invention was formed.

Comparative Example II-3

The procedure for formation of the recording layer (g) in Example II-5 was repeated except that the compound No. II-4 used in Example II-5 was not employed for the formation of the recording layer.

Thus, a comparative recording layer (k) was formed.

Comparative Example II-4

The procedure for formation of the recording layer (i) in Example II-7 was repeated except that the compound No. II-4 used in Example II-7 was not employed for the formation of the recording layer.

Thus, a comparative recording layer (1) was formed.

The absorbance of each of the recording layers (g) to (1) in Examples II-5 to II-8 and Comparative Examples II-3 and II-4 was measured immediately after the recording layer was exposed to a tungsten lamp of 50,000 lux, and 10, 50, and 100 hours later in the light resistance test.

The results are shown in TABLE 7.

TABLE 7

| | Absorbance of Recording Layer (*) | | | |
|---|---|---|---|---|
| | Initial stage | After 10 h. | After 50 h. | After 100 h. |
| Ex. II-5 | 1.00 | 0.942 | 0.691 | 0.492 |
| Ex. II-6 | 1.00 | 0.956 | 0.811 | 0.673 |
| Ex. II-7 | 1.00 | 0.809 | 0.341 | 0.117 |
| Ex. II-8 | 1.00 | 0.891 | 0.551 | 0.301 |

TABLE 7-continued

| | Absorbance of Recording Layer (*) | | | |
|---|---|---|---|---|
| | Initial stage | After 10 h. | After 50 h. | After 100 h. |
| Comp. Ex. II-3 | 1.00 | 0.644 | 0.114 | 0.015 |
| Comp. Ex. II-4 | 1.00 | 0.109 | ~0 | ~0 |

(*) The absorbance with time is expressed relative to the initial absorbance.

EXAMPLE III-1

A guide groove with a depth of 1600 Å, a half width of 0.30 μm, and a track pitch of 0.8 μm was formed on one surface of an injection molded polycarbonate substrate with a thickness of 0.6 mm. Compound No. III-12 shown in TABLE 3 was dissolved in tetrafluoropropanol, and the thus obtained solution of the compound No. III-12 was applied to the above prepared substrate by spinner coating, whereby a recording layer with a thickness of 800 Å was provided on the substrate. A gold reflection layer with a thickness of 2000 Å was then formed on the recording layer by sputtering. A protective layer with a thickness of 10 μm was further provided on the reflection layer using an acrylic photopolymer. Then, another injection molded polycarbonate substrate with a thickness of 0.6 mm was attached to the protective layer with an acrylic photopolymer interposed therebetween.

Thus, an optical recording medium No. 13 according to the present invention was obtained.

EXAMPLE III-2

The procedure for preparation of the optical recording medium No. 13 in Example III-1 was repeated except that the compound No. III-12 for use in the recording layer in Example III-1 was replaced by compound No. III-3 shown in TABLE 3.

Thus, an optical recording medium No. 14 according to the present invention was obtained.

EXAMPLE III-3

The procedure for preparation of the optical recording medium No. 13 in Example III-1 was repeated except that the compound No. III-12 for use in the recording layer in Example III-1 was replaced by compound No. III-8 shown in TABLE 3.

Thus, an optical recording medium No. 15 according to the present invention was obtained.

EXAMPLE III-4

The procedure for preparation of the optical recording medium No. 13 in Example III-1 was repeated except that the compound No. III-12 for use in the recording layer in Example III-1 was replaced by compound No. III-20 shown in TABLE 3.

Thus, an optical recording medium No. 16 according to the present invention was obtained.

EXAMPLE III-5

The procedure for preparation of the optical recording medium No. 13 in Example III-1 was repeated except that the compound No. III-12 for use in the recording layer in Example III-1 was replaced by compound No. III-36 shown in TABLE 3.

Thus, an optical recording medium No. 17 according to the present invention was obtained.

Comparative Example III-1

The procedure for preparation of the optical recording medium No. 13 in Example III-1 was repeated except that the compound No. III-12 for use in the, recording layer in Example III-1 was replaced by the compound No. C-1 described above.

Thus, a comparative optical recording medium No. 5 was obtained.

Comparative Example III-2

The procedure for preparation of the optical recording medium No. 13 in Example III-1 was repeated except that the compound No. III-12 for use in the recording layer in Example III-1 was replaced by the compound No. C-2 described above.

Thus, a comparative optical recording medium No. 6 was obtained.

To evaluate the recording and reproducing characteristics of each of the above prepared optical recording media Nos. 13 to 17 according to the present invention and comparative optical recording media Nos. 5 and 6, EFM signals were recorded in each recording medium by applying a semiconductor laser beam with a wavelength of 658 nm to each recording medium, while tracking was conducted, under the conditions that the recording linear speed was set at 3.0 m/sec and the shortest mark length was 0.4 μm.

Then, the recorded signals were reproduced using a continuous wave laser beam with a wavelength of 650 nm by the application of a reproduction power of 0.7 mW. The reflectance and the ratio of carrier to noise (C/N) initially obtained from each recording medium was measured.

A light resistance test was conducted in such a manner that each recording medium was caused to deteriorate by being continuously exposed to a tungsten lamp of 50,000 lux for 20 hours. After the light exposure, the reflectance and the C/N ratio of each recording medium were measured in the same manner as mentioned above.

The results are shown in TABLE 8.

TABLE 8

| | At Initial Stage | | After Light Resistance Test | |
|---|---|---|---|---|
| | Reflectance (%) | C/N (dB) | Reflectance (%) | C/N (dB) |
| Ex. III-1 | 53 | 55 | 52 | 53 |
| Ex. III-2 | 52 | 53 | 51 | 52 |
| Ex. III-3 | 54 | 55 | 53 | 53 |
| Ex. III-4 | 52 | 54 | 51 | 51 |
| Ex. III-5 | 53 | 54 | 52 | 52 |
| Comp. Ex. III-1 | 57 | 56 | 46 | 35 |
| Comp. Ex. III-2 | 66 | 57 | 52 | impossible to measure |

EXAMPLE III-6

A mixture of the compound No. C-1 used in Comparative Example III-1 and compound No. III-14 shown in TABLE 3 with a mixing ratio by weight of 10:3 was dissolved in tetrafluoropropanol. The thus obtained solution was applied to an injection molded polycarbonate substrate with a thickness of 1.2 mm by spinner coating.

Thus, a recording layer (m) with a thickness of 1000 Å for use in the present invention was formed on the substrate.

EXAMPLE III-7

The procedure for formation of the recording layer (m) in Example III-6 was repeated except that the compound No. III-14 used in Example III-6 was replaced by compound No. III-1.

Thus, a recording layer (n) for use in the present invention was formed.

EXAMPLE III-8

The procedure for formation of the recording layer (m) in Example III-6 was repeated except that the compound No. III-14 used in Example III-6 was replaced by compound No. III-10.

Thus, a recording layer (o) for use in the present invention was formed.

EXAMPLE III-9

The procedure for formation of the recording layer (m) in Example III-6 was repeated except that the compound No. III-14 used in Example III-6 was replaced by compound No. III-30.

Thus, a recording layer (p) for use in the present invention was formed.

EXAMPLE III-10

The procedure for formation of the recording layer (m) in Example III-6 was repeated except that the compound No. C-1 used in Example III-6 was replaced by the compound No. C-2.

Thus, a recording layer (q) for use in the present invention was formed.

Comparative Example III-3

The procedure for formation of the recording layer (m) in Example III-6 was repeated except that the compound No. III-14 used in Example III-6 was not employed for the formation of the recording layer.

Thus, a comparative recording layer (r) was formed.

Comparative Example III-4

The procedure for formation of the recording layer (q) in Example III-10 was repeated except that the compound No. III-14 used in Example III-10 was not employed for the formation of the recording layer.

Thus, a comparative recording layer (s) was formed.

The absorbance of each of the recording layers (m) to (s) in Examples III-6 to III-10 and Comparative Examples III-3 and III-4 was measured immediately after the recording layer was exposed to a tungsten lamp of 50,000 lux, and 10, 50, and 100 hours later in the light resistance test.

The results are shown in TABLE 9.

TABLE 9

| | Absorbance of Recording Layer (*) | | | |
|---|---|---|---|---|
| | Initial stage | After 10 h. | After 50 h. | After 100 h. |
| Ex. III-6 | 1.00 | 0.926 | 0.692 | 0.481 |
| Ex. III-7 | 1.00 | 0.895 | 0.601 | 0.396 |
| Ex. III-8 | 1.00 | 0.916 | 0.675 | 0.463 |
| Ex. III-9 | 1.00 | 0.940 | 0.742 | 0.478 |
| Ex. III-10 | 1.00 | 0.906 | 0.595 | 0.372 |
| Comp. Ex. III-3 | 1.00 | 0.644 | 0.114 | 0.015 |
| Comp. Ex. III-4 | 1.00 | 0.109 | ~0 | ~0 |

(*) The absorbance with time is expressed relative to the initial absorbance.

As previously explained, the formazan chelate compounds of formulas (I), (II) and (III) are highly soluble in the organic solvents, so that the recording layer comprising the formazan chelate compounds can be formed on the substrate by coating. Thus, an optical recording medium with excellent light resistance and storage stability can be provided. In particular, there can be obtained an optical recording medium which is suitable for a high-density optical disc system such as DVD-R using a semiconductor laser beam with a shorter wavelength.

Japanese Patent Application No. 11-191161 filed Jul. 6, 1999, Japanese Patent Application No. 2000-193869 filed Jun. 28, 2000, and Japanese Patent Application No. 2000-197466 filed Jun. 30, 2000 are hereby incorporated by reference.

What is claimed is:

1. An optical recording medium comprising a substrate, and a recording layer formed thereon comprising a formazan chelate compound selected from the group consisting of:

a compound represented by formula (I):

(I)

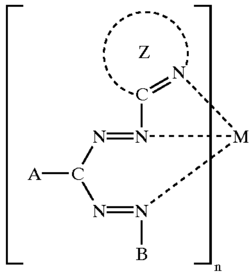

wherein Z represents a group that forms a polyheterocyclic ring with a carbon atom and a nitrogen atom that are bounded thereto, said polyheterocyclic ring being selected from the group consisting of a pyridazine ring, a pyrimidine ring and a triazine ring, A is an alkyl group, an aralkyl group, an aryl group, or cyclohexyl group, B is an aryl group, M represents a bivalent metal atom, and n represents the coordination number of formazan ligands;

a compound represented by formula (II):

(II)

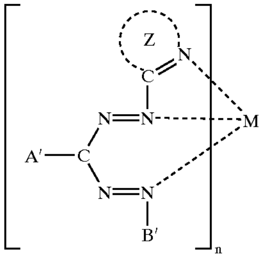

wherein Z represents a group that forms a polyheterocyclic ring with a carbon atom and a nitrogen atom that are bounded thereto, said polyheterocyclic ring being selected from the group consisting of a pyridazine ring, a pyrimidine ring and a triazine ring, A' represents a five-membered ring or six-membered ring, or a group that constitutes the heterocyclic ring, B' is an aryl group or an alkyl group, M represents a bivalent metal atom, and n represents the coordination number of formazan ligands; and a compound represented by formula (III):

(III)

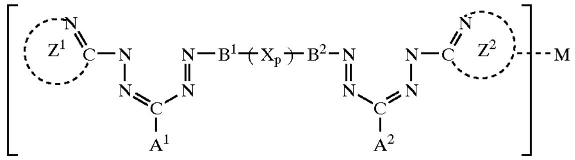

wherein $Z^1$ and $Z^2$ are each a group that forms a heterocyclic ring with a carbon atom and a nitrogen atom that are bounded thereto, $A^1$ and $A^2$ are each an alkyl group, an aralkyl group, an aryl group, or cyclohexyl group, $B^1$ and $B^2$ are each an aryl group, p is an integer of 0 or 1, and when p is 1, X is methylene group, or sulfone group, and M represents a bivalent metal atom.

2. The optical recording medium as claimed in claim 1, further comprising an undercoat layer which is provided between said substrate and said recording layer.

3. The optical recording medium as claimed in claim 2, further comprising a light reflection layer and a protective layer which are successively overlaid on said recording layer.

4. The optical recording medium as claimed in claim 1, further comprising a light reflection layer and a protective layer which are successively overlaid on said recording layer.

5. The optical recording medium as claimed in claim 4, further comprising an adhesive layer and a support member which are successively overlaid on said protective layer.

6. The optical recording medium as claimed in claim 5, further comprising an undercoat layer which is provided between said substrate and said recording layer.

7. The optical recording medium as claimed in claim 1, wherein said bivalent metal atom represented by M in formulas (I) to (III) is selected from the group consisting of iron, cobalt, nickel, copper, zinc, and palladium.

8. The optical recording medium as claimed in claim 1, wherein said recording layer further comprises a light absorbing dye which exhibits a maximum absorption wavelength a in a range of 550 to 650 nm.

9. The optical recording medium as claimed in claim 8, wherein said formazan chelate compound exhibits a maximum absorption wavelength b, with the relationship between a and b being b>a−50.

10. The optical recording medium as claimed in claim 8, wherein said light absorbing dye is selected from the group consisting of a polymethine dye, a squarylium dye, and an azo chelate dye.

11. The optical recording medium as claimed in claim 10, wherein said polymethine dye is a cyanine dye.

12. An optical recording medium comprising a substrate, and a recording layer formed thereon comprising a formazan chelate compound represented by formula (I):

(I)

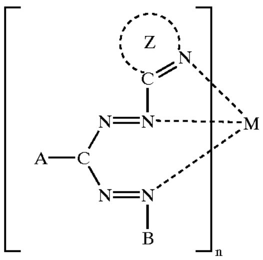

wherein Z represents a group that forms a polyheterocyclic ring with a carbon atom and a nitrogen atom that are bounded thereto, said polyheterocyclic ring being selected from the group consisting of a pyridazine ring, a pyrimidine ring and a triazine ring; A is an alkyl group, an aralkyl group, an aryl group, or cyclohexyl group; B is an aryl group; M represents a bivalent metal atom; and n represents the coordination number of formazan ligands.

13. An optical recording medium comprising a substrate, and a recording layer formed thereon comprising a formazan chelate compound represented by formula (II):

(II)

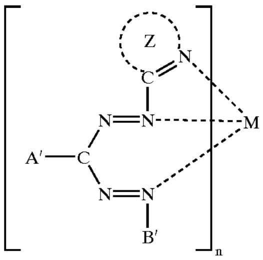

wherein Z represents a group that forms a polyheterocyclic ring with a carbon atom and a nitrogen atom that are bounded thereto, said polyheterocyclic ring being selected from the group consisting of a pyridazine ring, a pyrimidine ring and a triazine ring; A' represents a five-membered ring or six-membered ring, or a group that constitutes the heterocyclic ring; B' is an aryl group or an alkyl group; M represents a bivalent metal atom; and n represents the coordination number of formazan ligands.

14. An optical recording medium comprising a substrate, and a recording layer formed thereon comprising a formazan chelate compound represented by formula (III):

(III)

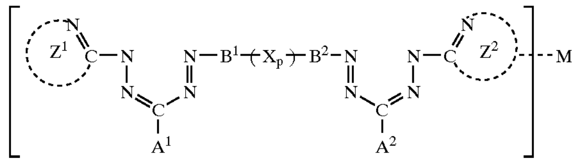

where $Z^1$ and $Z^2$are each a group that forms a heterocyclic ring with a carbon atom and a nitrogen atom that are bounded thereto; $A^1$ and $A^2$ are each an alkyl group, an aralkyl group, an aryl group, or cyclohexyl group; $B^1$ and $B^2$ are each an aryl group; p is an integer of 0 or 1, and when p is 1, X is methylene group, or sulfone group; and M represents a bivalent metal atom.

15. The optical recording medium as claimed in claim 14, wherein said heterocyclic ring formed together with $Z^1$ or $Z^2$ in formula (III) is selected from the group consisting of a pyridine ring, a pyridazine ring, a pyrimidine ring, a pyrazine ring, and a triazine ring.

* * * * *